United States Patent [19]
Fukuda et al.

[11] Patent Number: 5,862,405
[45] Date of Patent: Jan. 19, 1999

[54] PERIPHERAL UNIT SELECTION SYSTEM HAVING A CASCADE CONNECTION SIGNAL LINE

[75] Inventors: Atsuo Fukuda, Ashiya; Yasuo Masuo, Hirakata, both of Japan

[73] Assignee: Matsushita Electric Works, Ltd., Osaka, Japan

[21] Appl. No.: 751,329

[22] Filed: Nov. 18, 1996

[30] Foreign Application Priority Data

Dec. 25, 1995 [JP] Japan ..................................... 7-337581

[51] Int. Cl.$^6$ .............................. G06F 13/10; G06F 13/00
[52] U.S. Cl. ........................... 395/829; 395/828; 395/284
[58] Field of Search .................................... 395/829, 828, 395/821, 281, 284; 711/211

[56] References Cited

U.S. PATENT DOCUMENTS

| | | | |
|---|---|---|---|
| 4,360,870 | 11/1982 | McVey ..................................... | 395/829 |
| 4,373,181 | 2/1983 | Chisholm et al. ....................... | 711/211 |
| 4,573,120 | 2/1986 | Ichimiya et al. ........................ | 395/821 |
| 5,301,276 | 4/1994 | Kimura ..................................... | 395/829 |
| 5,404,460 | 4/1995 | Thomsen et al. ....................... | 395/829 |
| 5,551,053 | 8/1996 | Nadolski et al. ....................... | 395/829 |

FOREIGN PATENT DOCUMENTS 9621181  7/1996  WIPO .

Primary Examiner—Gopal C. Ray
Attorney, Agent, or Firm—Greenblum & Bernstein, P.L.C.

[57] ABSTRACT

A unit address is automatically set in a peripheral unit. A plurality of peripheral units 1 are connected to a CPU unit via a signal line 3. The CPU unit accesses each peripheral unit 1 by individually selecting the peripheral units. The signal line 3 is provided with a first signal line 31 for transmitting an address by bus connection of the peripheral units and a second signal 32 line for transmitting a write command signal by cascade connection of the peripheral units 1. The write command signal is sequentially transmitted in the order in which the peripheral units 1 are connected, and only the peripheral unit 1 that has received the write command signal receives a unit address and retains it in a latch circuit 11a.

19 Claims, 20 Drawing Sheets

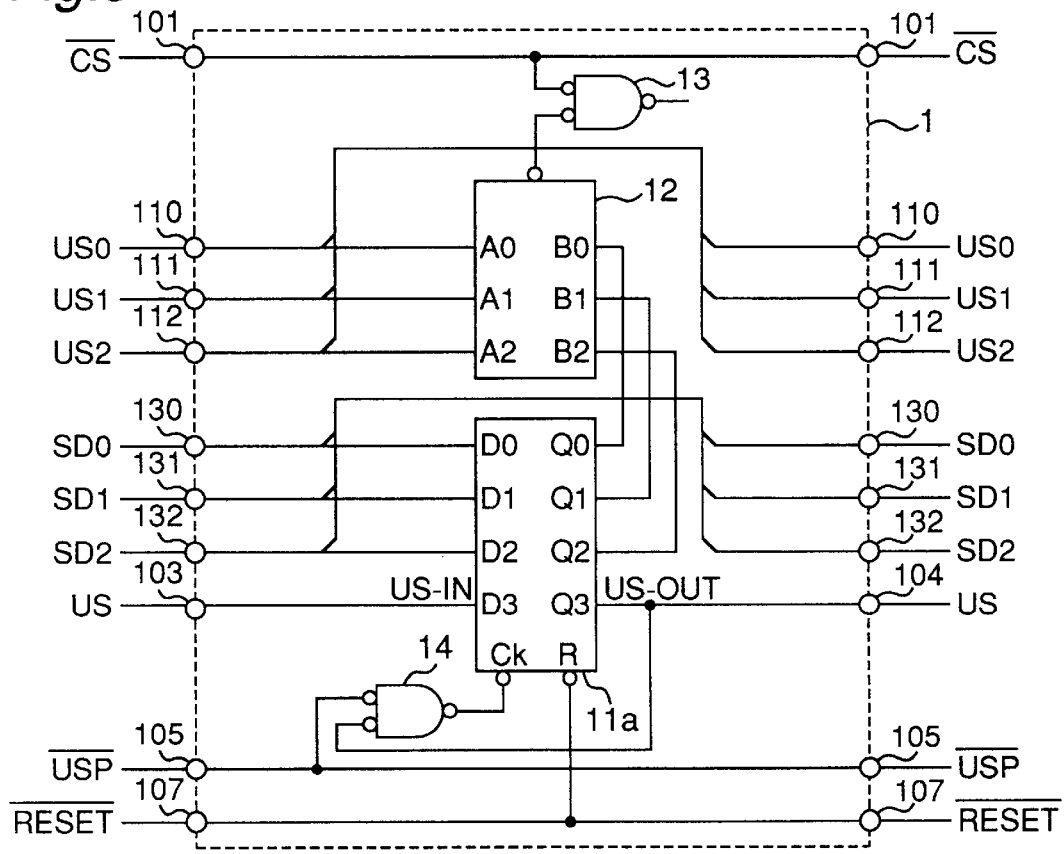

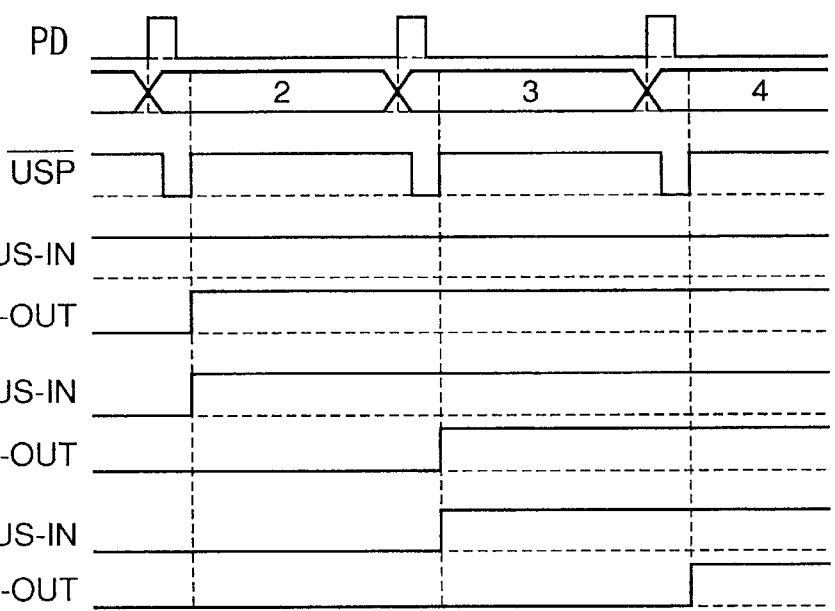

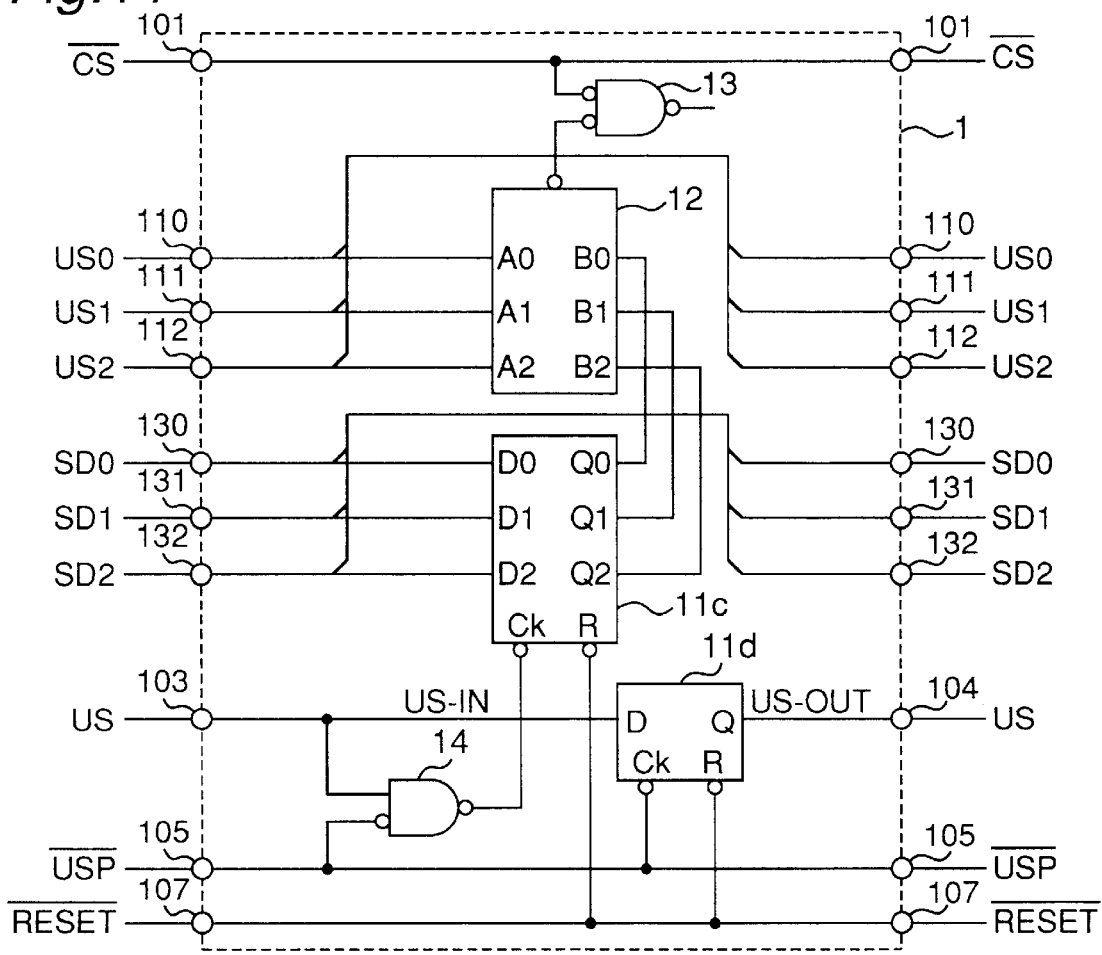

Fig.15A  $\overline{USP}$  
Fig.15B  $\overline{RESET}$  
Fig.15C  $\overline{1Q}$  
Fig.15E  $\overline{1Q}$  
Fig.15G  $\overline{1Q}$  

Fig.17A $\overline{USP}$
Fig.17B $\overline{RESET}$
Fig.17C Sel

Fig.17E $\overline{2Q}$
Fig.17F Sel

Fig.17H $\overline{2Q}$
Fig.17I Sel

Fig.17K $\overline{2Q}$

PERIPHERAL UNIT SELECTION SYSTEM HAVING A CASCADE CONNECTION SIGNAL LINE

BACKGROUND OF THE INVENTION

1. Field of the Invention

The present invention relates to a peripheral unit selection system constructed by connecting peripheral units to a CPU unit via a signal line such as a computer system or a programmable controller, in which the CPU unit selectively accesses the peripheral units.

2. Description of the Prior Art

Generally in a computer system or a programmable controller, the system is constructed by combining a CPU unit having a processor that operates according to a program with a peripheral unit having a function of assisting the CPU unit for the operations of data input/output and complicated calculation. It is usual to provide a plurality of peripheral units, and as shown in FIG. 23, peripheral units 1 are connected to a CPU unit 2 via a signal bus line 3. To communicate between CPU unit 2 and individual peripheral unit 1, it is necessary to individually select the peripheral units 1. In order to satisfy this demand, there has been considered the following structures.

A signal line for selecting each peripheral unit 1 is provided between the CPU unit 2 and each peripheral unit 1 so as to select each peripheral unit 1 via each signal line aside from the signal line 3 for communicating data. However, this structure requires signal lines corresponding in number to the peripheral units 1, causing a problem that the number of wiring lines increases according to the increase in number of the peripheral units 1 with the increase of the system scale.

In contrast to the above, there has been a structure in which each peripheral unit 1 is preparatorily provided with an individual unit address, and by sending a call address from the CPU unit 2 to the signal line 3, the peripheral unit 1 in which the unit address coinciding with the call address is set is selected. According to this structure, the peripheral units 1 are time-sharingly selected, and this arrangement has the advantage that the number of wiring lines does not increase even when there is an increased number of peripheral units 1 with the increase of the system scale.

However, according to the prior art structures, the unit address of each peripheral unit 1 has been set by a switch, and therefore, the unit address setting work is troublesome. Furthermore, the unit addresses have been individually set in the peripheral units 1. Therefore, in the case where an increased number of peripheral units 1 are there or an additional peripheral unit 1 is subsequently incorporated, there is the problem that erroneous setting such as over-lapped unit address setting tends to occur.

In the international application published Jul. 11, 1996 (WO 96/21181) based on U.S. application Ser. No. 08/365, 655 filed Dec. 29, 1994, there is disclosed an expansion module address method and apparatus wherein a programmable controller (PLC) base unit sends an address number to an expansion I/O module and to modules attached thereto, each expansion module takes the number it receives and considers it to be own address number, and the expansion module decrements the number and passes it onto the next module unless the number is zero. This method and apparatus may be a solution to the problem mentioned above.

SUMMARY OF THE INVENTION

The object of the present invention is to provide a variety of peripheral unit selection systems which can be solutions to the above-mentioned problem based on ideas different from the idea in the method and apparatus disclosed in the international application mentioned above. In order to avoid the above problem, the present invention enables selection between a plurality of peripheral units with a reduced number of wiring lines mainly by adopting a structure for setting a unit address in each peripheral unit and selecting each peripheral unit by a call address from a CPU unit and making the setting work easier by automating the unit address setting while preventing erroneous setting from occurring.

According to the present invention, even if a peripheral unit is mounted in any desired slot, the CPU unit automatically sets an address for each peripheral unit and therefore, the user of the peripheral unit selection system does not need to set an address for each peripheral unit by a switch or so forth. As a result, it will take less time to construct a system and erroneous setting will be prevented.

Various aspects of the present invention will be described hereinafter.

According to a first aspect of the present invention, there is provided a peripheral unit selection system having a plurality of peripheral units and a CPU unit, said peripheral unit selection system comprising:

a first signal line for connecting the CPU unit with the plurality of peripheral units;

a second signal line for connecting in cascade the CPU unit and the plurality of peripheral units;

first interface means provided in the CPU unit for transmitting a selection signal and a write address to the first signal line and transmitting a write command signal to the second signal line to set an address for each of the peripheral units, and for transmitting a call address to the first signal line to select the peripheral units individually; and second interface means provided in each of the peripheral units, comprising:

address setting means for storing the write address transmitted together with the selection signal through the first signal line from the CPU unit as a unit address;

signal transmitting means for transmitting the write command signal transferred through the second signal line from the CPU unit sequentially to the peripheral unit of a subsequent stage every time the selection signal is received;

gate means for inhibiting the selection signal from being received in response to the transmission of the write command signal to the peripheral unit of the subsequent stage; and access permitting means for comparing the call address transmitted from the CPU unit through the first signal line with the unit address set in the address setting means and permitting access from the CPU unit when the addresses coincide with each other.

According to the above arrangement, the peripheral units are put into an address writing state in the order in which they are connected when an address is set in each peripheral unit, so that a unit address is individually written into each peripheral unit. Accordingly, there is no possibility of the occurrence of erroneous setting so long as there is no error in the write address generated by the CPU unit. Furthermore, by setting a unit address in every peripheral unit from the CPU unit, the unit address setting work is made easier than in the prior art structure in which the peripheral units are individually operated for the setting.

According to the second aspect of the present invention, based on the first aspect of the present invention, there is provided a peripheral unit, wherein the first signal line comprises a parallel transmission line for transmitting the call address as parallel data and a serial transmission line for transmitting the write address as serial data;

the address setting means comprises a serial-to-parallel converter circuit for converting the write address of the serial data inputted from the second line into parallel data, and a first latch circuit for latching the write address of the parallel data outputted from the serial-to-parallel converter circuit when the selection signal is inputted;

the signal transmitting means comprises a second latch circuit for latching the write command signal transmitted from the CPU unit when the selection signal is inputted; and the gate means comprises a gate circuit for inhibiting the selection signal from being inputted to the first and second latch circuit upon receiving the write command signal latched in the second latch circuit.

According to the above arrangement, the transmission of the write address can be achieved only by one signal line, and therefore, the number of the signal lines is reduced.

According to the third aspect of the present invention, there is provided a peripheral unit selection system having a plurality of peripheral units and a CPU unit, said peripheral unit selection system comprising:

a first signal line for connecting the CPU unit with the plurality of peripheral units;

a second signal line for connecting in cascade the CPU unit and the plurality of peripheral units;

first interface means provided in the CPU unit for transmitting a selection signal and a pulse signal synchronized with the selection signal to the first signal line and transmitting a write command signal to the second signal line to set an address for each of the peripheral units, and for transmitting a call address to the first signal line to select the peripheral units individually; and second interface means provided in each of the peripheral units, comprising:

a counter for counting pulse signals transmitted from the CPU unit;

a latch circuit for latching an output value of the counter as a unit address and for latching the write command signal transmitted from the CPU unit and outputting the latched signal to the peripheral unit of a subsequent stage as a write command signal, when the selection signal is inputted;

a gate circuit for inhibiting the selection signal from being inputted to the latch circuit upon receiving the write command signal latched in the latch circuit when the write command signal is transmitted to the peripheral unit of the subsequent stage with the latching of the write command signal in the latch circuit; and access permitting means for comparing the call address transmitted from the CPU unit with the unit address set in the latch circuit and permitting access from the CPU unit when the addresses coincide with each other.

According to the above arrangement, the count value of the counter becomes the unit address. Consequently, the number of signal lines required for transmitting the write address is reduced and the write address is automatically generated. Therefore, the possibility of the occurrence of erroneous setting of the unit address is remarkably reduced.

According to the fourth aspect of the present invention, there is provided a peripheral unit selection system having a plurality of peripheral units and a CPU unit, said peripheral unit selection system comprising:

a first signal line for connecting the CPU unit with the plurality of peripheral units;

a second signal line for connecting in cascade the CPU unit and the plurality of peripheral units;

first interface means provided in the CPU unit for transmitting a selection signal to the first signal line to set an address for each of the peripheral units, and for transmitting an address to the second signal line to set an address for each of the peripheral units and to select the peripheral units individually;

second interface means provided in each of the peripheral units, comprising:

a latch circuit for latching the address transmitted from the CPU unit as a unit address every time the selection signal transmitted from the CPU unit is inputted;

an arithmetic circuit for outputting a value obtained by subjecting the address transferred from the CPU unit to addition or subtraction with a specified value to the peripheral unit of a subsequent stage as an address when no unit address is set in the latch circuit, and outputting the address transferred from the CPU unit to the peripheral unit of the subsequent stage as an address when a unit address is set; and access permitting means for comparing the address transferred from the CPU unit through the second signal line with the unit address set in the latch circuit and permitting access from the CPU unit when the addresses coincide with each other.

According to the fifth aspect of the present invention, there is provided a peripheral unit selection system having a plurality of peripheral units and a CPU unit, said peripheral unit selection system comprising:

a first signal line for connecting the CPU unit with the plurality of peripheral units;

a second signal line for connecting in cascade the CPU unit and the plurality of peripheral units;

first interface means provided in the CPU unit for transmitting a reset signal to the first signal line to initialize the operation of selection of the peripheral units, and for transmitting selection signals the number of which corresponds to the peripheral unit to be selected to the first signal line and transmitting a selection command signal to the second signal line to select the peripheral units individually;

second interface means provided in each of the peripheral units, comprising:

signal transmitting means for transmitting the selection command signal to the peripheral unit of a subsequent stage via the second signal line on receiving the selection signal transmitted from the CPU unit while the selection command signal is inputted from the CPU unit side via the second signal line;

access permitting means for permitting access from the CPU unit by the selection signal before transmitting the selection command signal to the peripheral unit of the subsequent stage and for inhibiting access from the CPU unit when the selection signal is inputted after transmitting the selection command signal;

gate means for inhibiting the selection signal from being received when the selection signal is inputted after transmitting the selection command signal to the peripheral unit of the subsequent stage; and reset means for resetting each of the signal transmitting means, the access permitting means and the gate means to an initial state by the reset signal.

According to the above arrangement, the peripheral units are individually selected without setting any address in the peripheral units, thereby allowing the access from the CPU unit to be achieved. That is, by transmitting selection signals corresponding in number to the peripheral units to the peripheral units in the order in which the peripheral units are connected serially from the CPU unit, access from the CPU unit to each peripheral unit is permitted. Therefore, when changing the peripheral unit to be accessed, an identical procedure is repeated by the reset signal. However, a time delay required for the access has no problem when there is a relatively small number of peripheral units, and this arrangement is rather advantageous in the point that the number of the signal lines can be reduced.

According to the sixth aspect of the present invention, based on the first aspect of the present invention, there is provided a mother board in a peripheral unit selection system in which a plurality of peripheral units mounted removably in a plurality of mounting slots provided on a mother board are connected to a CPU unit via signal lines and the CPU unit accesses each peripheral unit by individually selecting the peripheral units, the mother board comprising:

a cascade connection signal line for connecting in cascade the CPU unit and the peripheral units mounted in the mounting slots; and path selecting means provided for each mounting unit, for selecting between a state in which the cascade connection signal line from the CPU unit side is connected to a subsequent stage side through the peripheral unit mounted in each mounting unit and a state in which the cascade connection signal line is connected to the subsequent stage side without being put through any peripheral unit.

According to the above arrangement, in the case where the peripheral units are mounted in the plurality of unit mounting slots provided on the mother board, even though no peripheral unit is mounted in the unit mounting slots when the peripheral units include a signal line to be serially connected, the signal transmission to the peripheral unit in the next stage can be achieved by selecting the state of the path selecting means. That is, the peripheral units are not required to be mounted in order without leaving vacancy between them in the unit mounting slots, and this ensures a high degree of freedom in mounting and removing each peripheral unit.

According to the seventh aspect of the present invention, there is provided a peripheral unit selection system having a plurality of peripheral units and a CPU unit, said peripheral unit selection system comprising:

a mother board comprising:
  a plurality of mounting slots in which the plurality of peripheral units are mounted removably,
  a first signal line for connecting the CPU unit with the plurality of peripheral units, and
  a second signal line for connecting in cascade the CPU unit and the plurality of peripheral units;

first interface means provided in the CPU unit for transmitting a selection signal and a write address to the first signal line and transmitting a write command signal to the second signal line to set an address for each of the peripheral units, and for transmitting a call address to the first signal line to select the peripheral units individually;

second interface means provided in each of the peripheral units, comprising:

address setting means for storing the write address transmitted together with the selection signal through the first signal line from the CPU unit as a unit address, and access permitting means for comparing the call address transmitted from the CPU unit through the first signal line with the unit address set in the address setting means and permitting access from the CPU unit when the addresses coincide with each other;

signal transmitting means provided for each mounting slot on the mother board, for transmitting the write command signal transferred through the second signal line from the CPU unit sequentially to the peripheral unit of a subsequent stage every time the selection signal is received; and gate means provided for each mounting slot on the mother board, for inhibiting the selection signal from being received upon transmitting the write command signal to the peripheral unit of the subsequent stage.

According to the above arrangement, similarly to the sixth aspect of the present invention, the degree of freedom in mounting and removing each peripheral unit in the unit mounting slots is increased. Furthermore, by providing the circuit to be used for unit address setting on the mother board side, the path selecting means can be eliminated, and this leads to the compacting of each peripheral unit.

BRIEF DESCRIPTION OF THE DRAWINGS

FIG. 3 is a circuit diagram illustrating an interface circuit of a peripheral unit according to the first embodiment of the present invention;

FIGS. 4A–4H show signal waveforms representing the operation of the peripheral unit selection system according to the first embodiment;

FIGS. 10A–10I show signal waveforms representing the operation of the peripheral unit selection system according to the sixth embodiment;

FIG. 11 is a circuit diagram illustrating an interface circuit of a peripheral unit according to the seventh embodiment of the present invention;

FIGS. 12A–12H show signal waveforms representing the operation of the peripheral unit selection system according to the seventh embodiment;

FIGS. 15A–15H show signal waveforms representing the operation of the peripheral unit selection system according to the ninth embodiment;

FIG. 16 is a circuit diagram illustrating an interface circuit of a peripheral unit according to the tenth embodiment of the present invention;

FIGS. 17A–17K show signal waveforms representing the operation of the peripheral unit selection system according to the tenth embodiment;

DETAILED DESCRIPTION OF THE PREFERRED EMBODIMENTS

Figure 1:
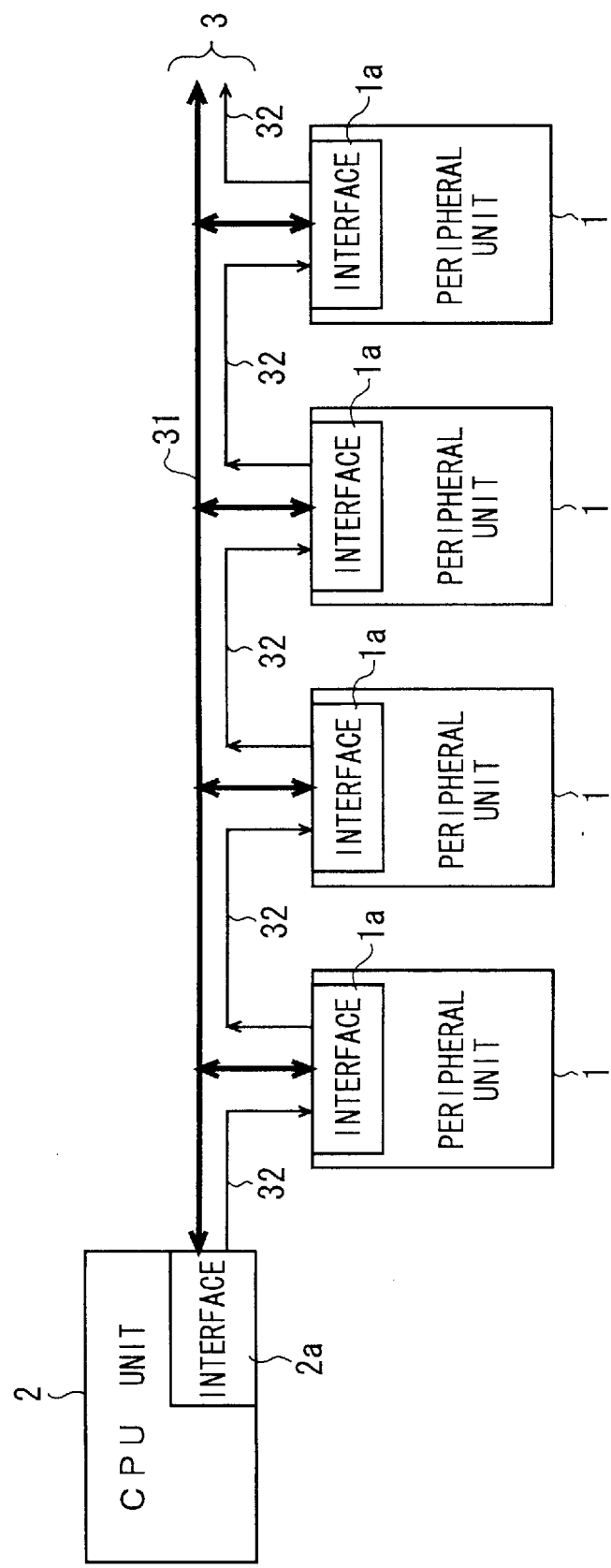
FIG. 1 is a block diagram illustrating a peripheral unit selection system embodying the present invention.
Figure 23:
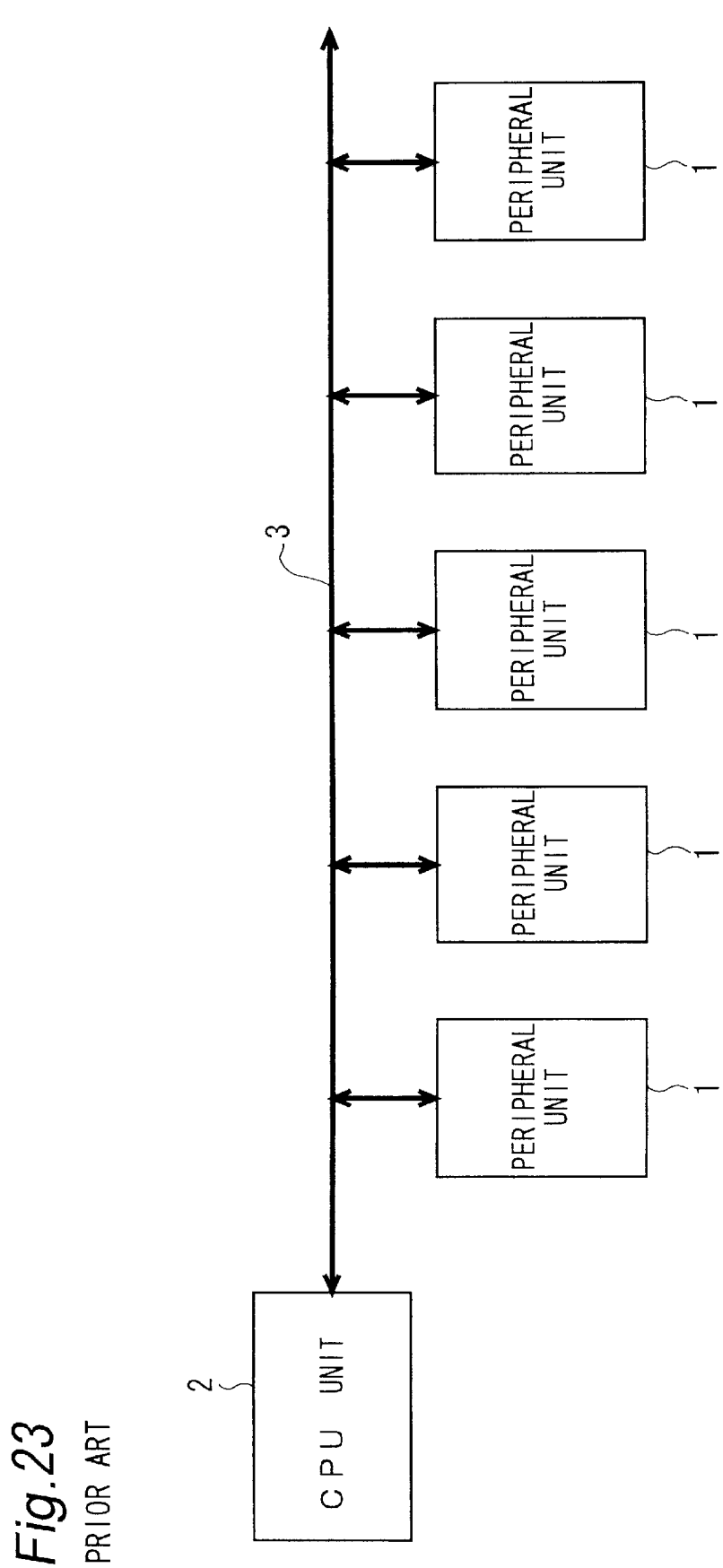
FIG. 23 is a block diagram illustrating a peripheral unit selection system according to a prior art.

The following embodiments are each premised that a plurality of peripheral units 1 are connected to a CPU unit 2 via a signal line 3 similarly to the prior art structure shown in FIG. 23. However, in each of the following embodiments, the signal line 3 is comprised of a first signal line 31 for making a bus connection between the CPU unit and the plurality of peripheral units and a second signal line 32 for making a cascade connection among the plurality of peripheral units and connecting the CPU unit to the first stage of the plurality of peripheral units as shown in FIG. 1. In this respect the signal line 3 of each embodiment is different from the signal line 3 of the conventional peripheral unit selection system shown in FIG. 23.

Figure 2A:
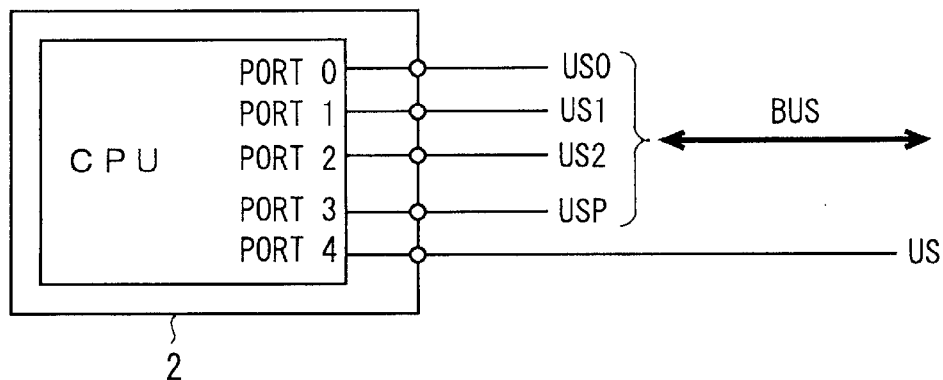
FIGS. 2A–2D are block diagrams illustrating various interface circuits of a CPU unit in the peripheral unit selection system embodying the present invention.
Figure 2B:
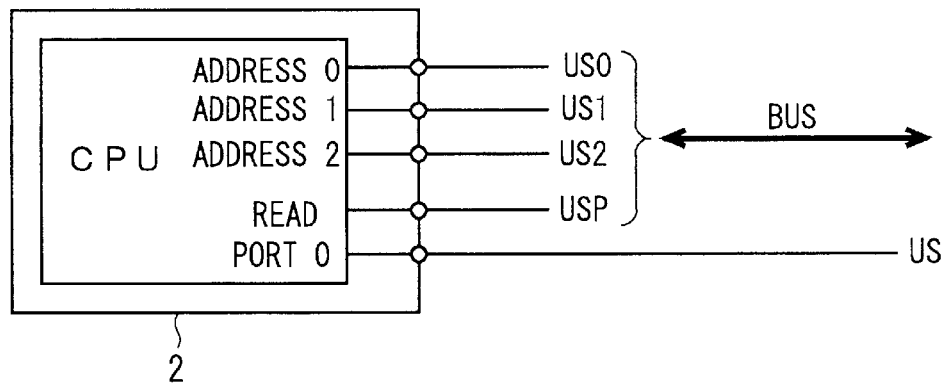
Figure 2C:
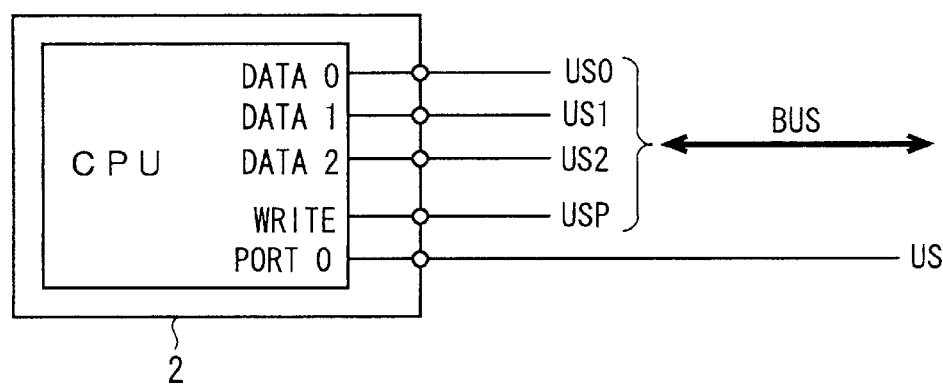
Figure 2D:
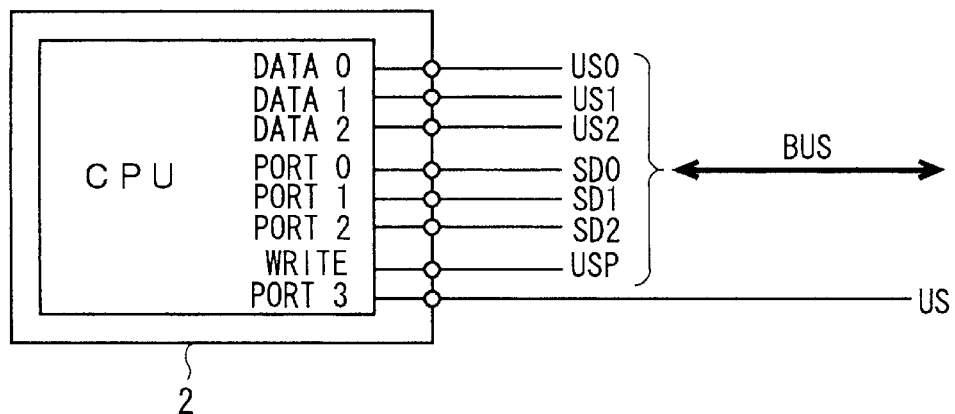

In each of the following embodiments of the present invention, an interface circuit 2a is used to transmit certain signals from the CPU unit 2 to the signal lines 31 and 32. The interface circuit 2a in the CPU unit 2 can be implemented in the manner shown in FIGS. 2A–2D. That is, for example, each signal wire of the first signal line 31 and the second signal line 32 can be connected to each of output ports 0–4 provided for a CPU in the CPU unit 2 as shown in FIGS. 2A, 2B and the CPU can execute a certain program for outputting certain signals via the output ports, and thereby the CPU unit 2 can send the signals mentioned below to be used for access to each peripheral unit 1. Alternatively, some signal wires of the signal lines 31 and 32 may be connected to address signal terminals and memory control signal (i.e. a read signal or write signal) terminal instead of or in addition to the output ports. Furthermore, data signal terminals may be used instead of the address signal terminals and write signal terminals may be used instead of the read signal terminal as shown in FIGS. 2C and 2D.

An interface circuit 1a in each peripheral unit 1 receives signals transmitted from the CPU unit 2 via the signal lines 31 and 32 and transfers the signals to the peripheral unit 2 of the subsequent stage, and thereby the interface unit 1a controls access from the CPU unit 2 to the peripheral unit 1. The detail of arrangement and operation in the interface circuit 1a of the peripheral unit 1 depends on each embodiment as described below.

Furthermore, in each of the following embodiments, a path of data to be communicated between the CPU unit 2 and the peripheral units 1 is omitted, and only a structure for setting a unit address in each peripheral unit 1 and a structure for enabling data communication between the peripheral units 1 and the CPU unit 2 by means of a call address from the CPU unit 2 and a unit address set in each peripheral unit 1 are shown.

First embodiment

As shown in FIG. 3, the interface circuit 1a in the peripheral unit 1 of the present embodiment is provided with a latch circuit 11a which serves as an address setting means for storing therein a unit address, an address comparing circuit 12 which outputs a coincidence signal when the call address transmitted from the CPU unit 2 coincides with the unit address set in the latch circuit 11a, a first gate circuit 13 which allows a select signal CS from the CPU unit 2 to pass through it when the coincidence signal is outputted from the address comparing circuit 12, and a second gate circuit 14 which generates a write signal for the latch circuit 11a based on a selection signal USP from the CPU unit 2.

In this case, the call address from the CPU unit 2 has three bits. Via the signal line 31 are transmitted a 3-bit address signal (call address) US0,US1,US2 and a 3-bit write address SD0,SD1,SD2 together with the select signal CS, the selection signal USP and a reset signal RESET each having one bit. Via the signal line 32 is transmitted a 1-bit write command signal US. Among these signals, only the write command signal US is sequentially transmitted from the peripheral unit 1 located near (the term "near" means the nearness in terms of signal path, not the spatial distance) the CPU unit 2, while the other signals are simultaneously transmitted to all the peripheral units 1. That is, the signal 32 line used for transmitting the write command signal US connects the plurality of peripheral units 1 in cascade and connects the first stage in the peripheral units to the CPU unit 2, while the other signal lines connects the peripheral units 1 to the CPU unit 2 by bus connection.

For inputting or outputting of the above-mentioned signals, the peripheral unit 1 of the present embodiment is provided with the following terminals:

(1) bus connection terminals 101, 105 and 107 connected to the signal line 31 for inputting the select signal CS, the selection signal USP and a reset signal RESET respectively, (2) bus connection terminals 110,111,112 connected to the signal line 31 for inputting the call address US0,US1,US2 respectively, (3) bus connection terminals 130,131,132 connected to the signal line 31 for inputting the write address SD0,SD1, SD2 respectively, and (4) input and output terminals 103,104 connected to the signal line 32 for inputting and outputting the write command signal US respectively.

In the peripheral unit 1 shown in FIG. 3, the latch circuit 11a is constructed so that it latches 4-bit data, and three bits among the four bits are used as the unit address, and the other one bit is used for transmitting the write command signal US. The latch circuit 11a latches the bit value inputted to its input terminals D0 through D3 every rise time of a signal inputted from the second gate circuit 14 to a clock terminal Ck, and continues to output each inputted bit value from its output terminals Q0 through Q3 until the signal to the clock terminal Ck rises subsequently or a reset signal RESET is inputted to its reset terminal R. The input terminal D3 and the output terminal Q3 for use in transmitting the write command signal US are connected serially (i.e. unit by unit) from the CPU unit 2. In detail, the input terminal D3 of the latch circuit 11a in the peripheral unit 1 of the first stage located nearest to the CPU unit 2 is connected to the CPU unit 2, the input terminal D3 of the latch circuit 11a in the peripheral unit 1 of the second stage located second nearest to the CPU unit 2 is connected to the output terminal Q3 of the latch circuit 11a in the peripheral unit 1 of the first stage. The other input terminals D0,D1,D2 of, the latch circuit 11a are connected in parallel by bus connection in each peripheral unit 1.

One input of the second gate circuit 14 is the output of the output terminal Q3 of the latch circuit 11a, and when the output of the output terminal Q3 is at low level ("low level" is referred to as "L-level" hereinbelow), the other input of the second gate circuit 14 is inputted to the clock terminal Ck of the latch circuit 11a. The other input of the second gate circuit 14 is the selection signal USP from the CPU unit 2, while the selection signal USP is inputted as a signal that comes to have L-level in a specified time period. Therefore, when the selection signal USP is generated in a period in which the output of the output terminal Q3 of the latch circuit 11 is at L-level, the input to the clock terminal Ck of the latch circuit 11 rises simultaneously with the rise of the selection signal USP, so that bit values inputted to the input terminals D0 through D3 of the latch circuit 11 appear at the output terminals Q0 through Q3 respectively.

Furthermore, the address comparing circuit 12 is a 3-bit digital comparator and operates to output a coincidence signal to the first gate circuit 13 when the bit values inputted to the input terminals A0 through A2 and B0 through B2 each having three bits coincide with each other. The coincidence signal is a signal for bringing one input of the first gate circuit 13 at L-level, and in this state, the other input of the first gate circuit 13 appears at the output. The other input of the first gate circuit 13 is the select signal CS from the CPU unit 2. When an L-level (active) select signal CS is inputted in a state in which the coincidence signal is outputted from the address comparing circuit 12, the output from the first gate circuit 13 comes to have L-level (active) to permit data communication between the peripheral unit 1 and the CPU unit 2.

Operation will be described next. When the CPU unit 2 instructs the latch circuit 11a of each peripheral unit 1 to write a unit address, the CPU unit 2 inputs the write address SD0,SD1,SD2 to the input terminals D0,D1,D2 of the latch circuit 11a via the terminals 130,131,132 of the peripheral unit 1 as shown in FIG. 4A, and transmits the selection signal USP that comes to have L-level in a specified time period as shown in FIG. 4B every time the write address SD0,SD1,SD2 is changed. Further, the CPU unit 2 sends the write command signal US of high level ("high level" is referred to as "H-level" hereinbelow) to the input terminal D3 of the latch circuit 11a via the terminal 103 of the peripheral unit 1. The above transmission of the write address SD0,SD1,SD2, the selection signal USP and the write command signal US from the CPU unit may be achieved in the aforementioned manner shown in FIG. 2D.

In this case, at the time point when the writing of the unit address is started, only the input signal US-IN (refer to FIG. 4C) to the input terminal D3 of the latch circuit 11a of the peripheral unit 1 located nearest to the CPU unit 2 is at H-level, while the input signal to the input terminal D3 of the latch circuit 11a of the peripheral units 1 in the second and subsequent stages is at L-level. When the selection signal USP is inputted, the output of the gate circuit 14 changes and then the input signal of the clock terminal Ck of the latch circuit 11a rises. Consequently, the write address SD0,SD1, SD2 and the write command signal US are held in the latch circuit 11a. At this time point, an output signal US-OUT from the output terminal Q3 of the latch circuit 11a comes to have H-level as shown in FIG. 4D, and therefore, the output of the gate circuit 14 does not change even when the selection signal USP is inputted. At the same time, the input signal US-IN to the input terminal D3 of the latch circuit 11a of the peripheral unit 1 in the next stage comes to have H-level (refer to FIG. 4E). Subsequently, the write command signal US will be sequentially (i.e. unit by unit) transmitted at each peripheral unit 1 in a manner as described above (refer to FIGS. 4F,4G,4H).

By the aforementioned operation, the write address SD0, SD1,SD2 and the selection signal USP are concurrently transmitted to all the peripheral units 1. However, since the write command signal US is sequentially transmitted to each peripheral unit 1, the write address SD0,SD1,SD2 can be transmitted individually to the latch circuits 11a of the peripheral units 1. What is essential is that the order of connection of the peripheral units from the CPU unit 2 is utilized to identify each peripheral unit 1 in the initial state in which no unit address is set in the peripheral units 1. In other words, by putting the peripheral units 1 one by one into a state in which the write address SD0,SD1,SD2 is permitted to be written, transmission of information to each peripheral unit 1 is enabled without using any address. Furthermore, the unit addresses of the peripheral units 1 are automatically written from the CPU unit 2 and the unit addresses are written according to the order of connection of the peripheral units 1. Therefore, the possible occurrence of erroneous setting of the unit address can be prevented.

After the unit addresses are set in the latch circuits 11a in a manner as described above, by transmitting the address signal (call address) US0,US1,US2 to the signal line 31 and transmitting an L-level select signal CS, the output of the address comparing circuit 12 becomes active in the peripheral unit 1 in which the unit address coinciding with the call address is set, and the select signal CS passes through the gate circuit 13 to allow the peripheral unit 1 to be accessed.

The call address and the unit address are each provided by three bits in the aforementioned embodiment. However, when the peripheral units 1 are increased in number, the increase can be easily coped with by increasing the number of bits of the address.

Second embodiment

Figure 5:
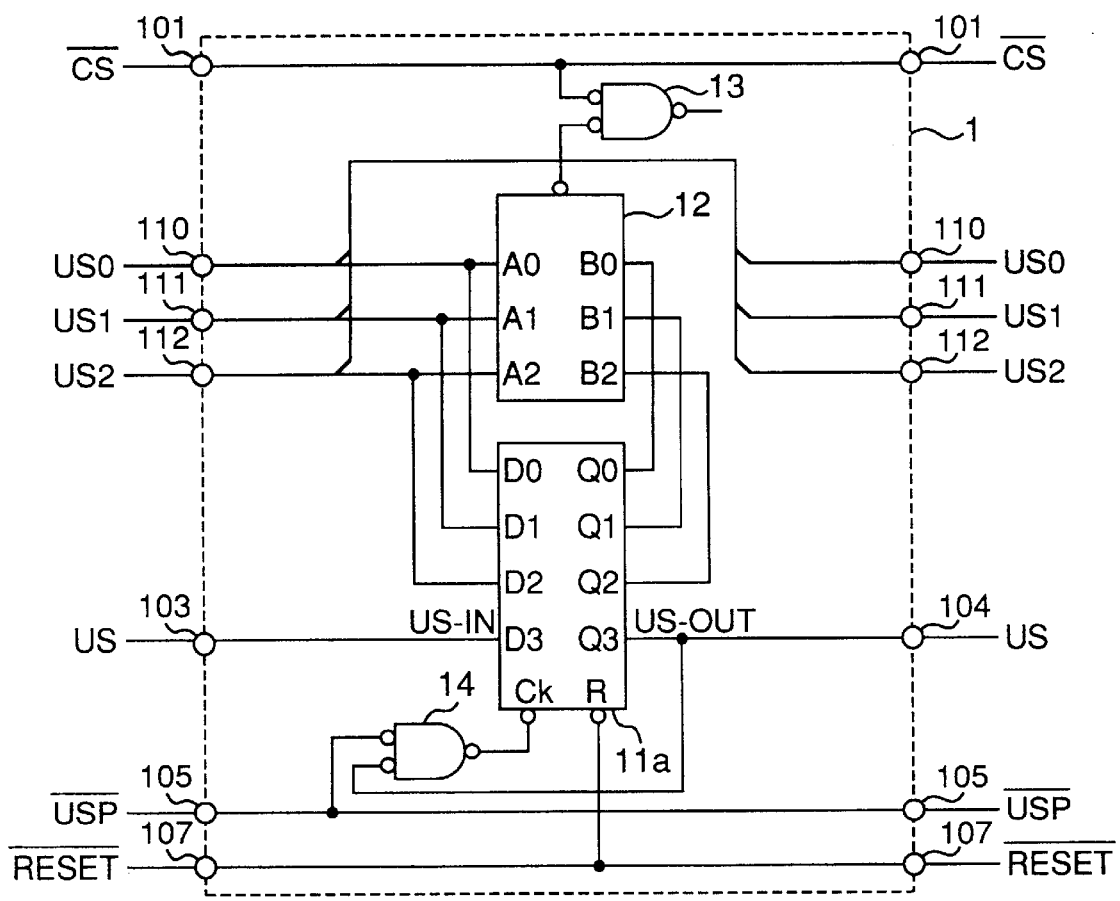
FIG. 5 is a circuit diagram illustrating an interface circuit of a peripheral unit according to the second embodiment of the present invention.
Figure 6:
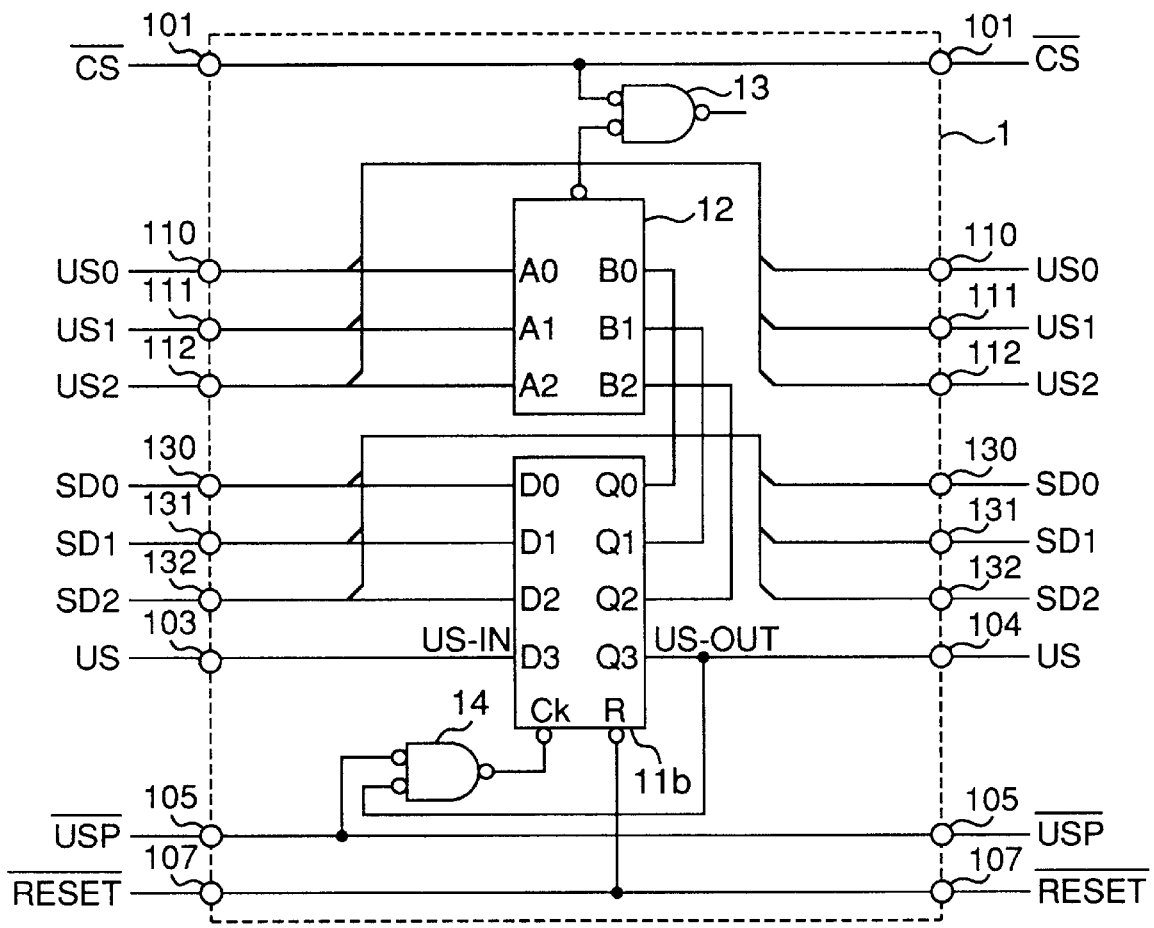
FIG. 6 is a circuit diagram illustrating an interface circuit of a peripheral unit according to the third embodiment of the present invention.

In the first embodiment, the write address SD0,SD1,SD2 and the call address US0,US1,US2 are transmitted in different paths. In contrast to the above, as shown in FIG. 5, both of the addresses are transmitted in an identical path in the present embodiment. In setting a unit address, the latch circuit 11a is once reset, and therefore, the output value is "000". Therefore, by using a write address other than "000", the select signal CS does not pass through the gate circuit 13, allowing an operation similar to that of the first embodiment. By adopting this structure, the number of wires for the signal line 3 (line 31) can be reduced further than in the first embodiment, and this leads to cost reduction. The other structure and operation are similar to those of the first embodiment Third embodiment As shown in FIG. 6, the peripheral unit 1 of the present embodiment has a structure in which the latch circuit 11a of the first embodiment is implemented by a D-type flip-flop 11b. The other structure and operation are similar to those of the first embodiment.

Fourth embodiment

Figure 7:
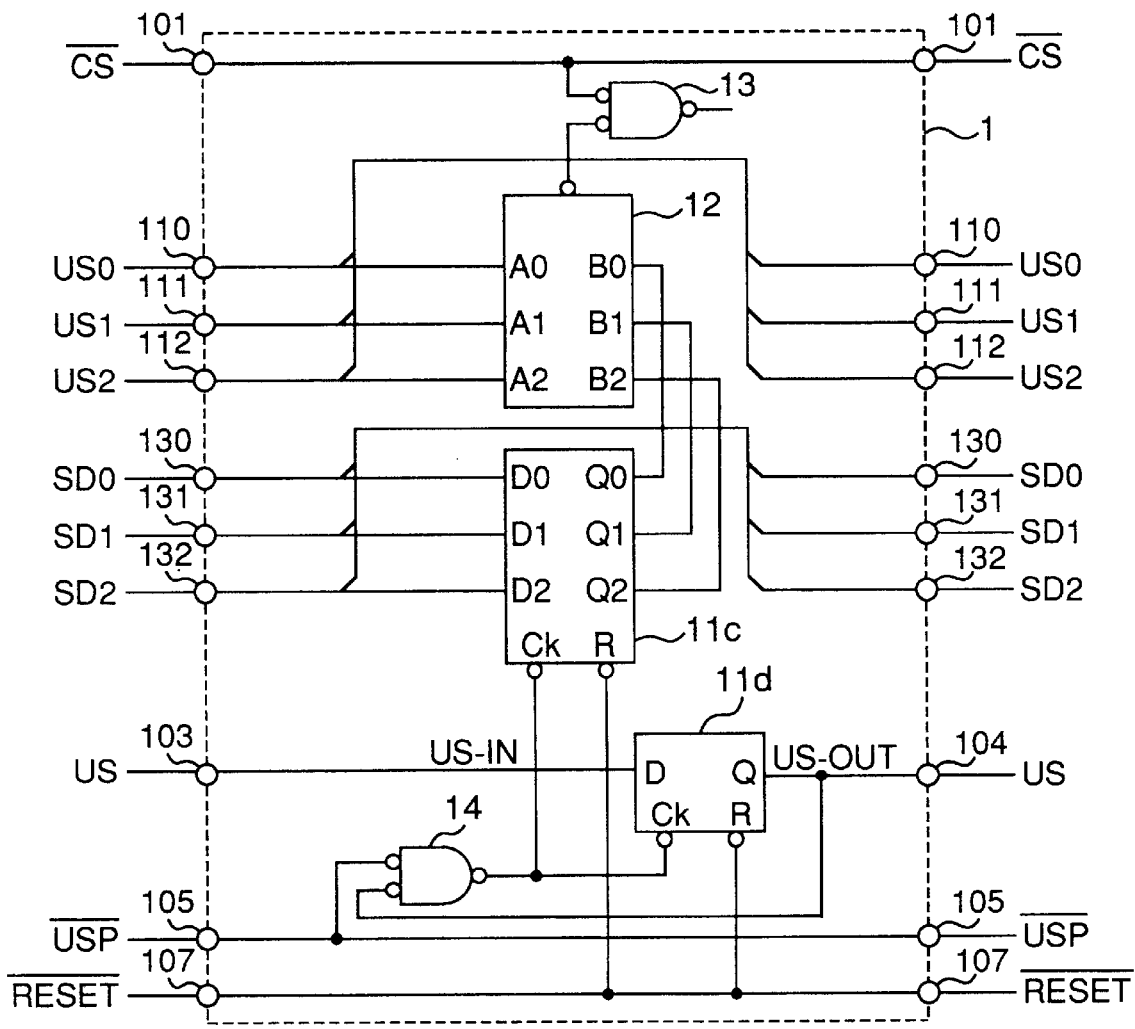
FIG. 7 is a circuit diagram illustrating an interface circuit of a peripheral unit according to the fourth embodiment of the present invention.

As shown in FIG. 7, the peripheral unit 1 of the present embodiment has a structure in which a 3-bit latch circuit 11c for retaining the unit address and a 1-bit latch circuit 11d for transferring the write command signal US are provided separately by function in place of the latch circuit 11a of the first embodiment. The other structure and operation are similar to those of the first embodiment.

Fifth embodiment

Figure 8A:
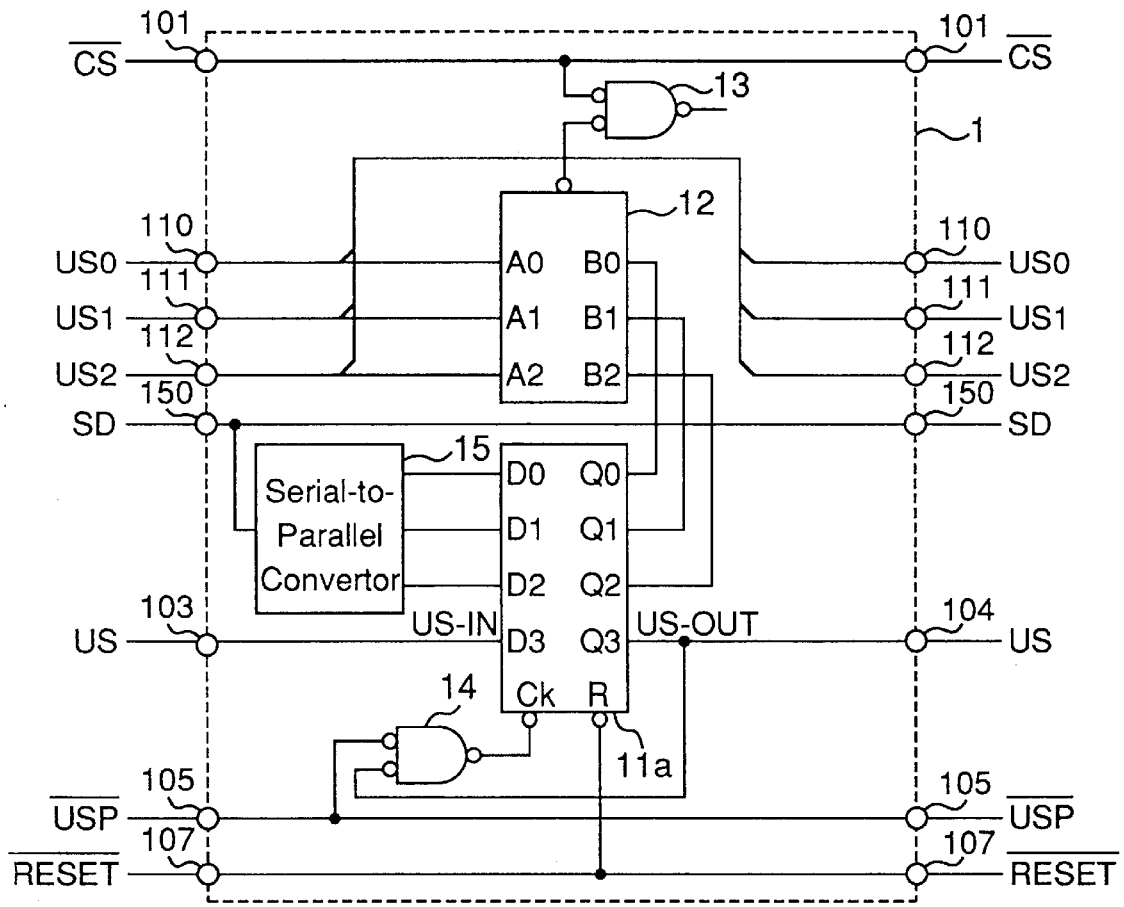
FIGS. 8A,8B are circuit diagrams illustrating interface circuits of a peripheral unit and a CPU unit in the peripheral unit selection system according to the fifth embodiment of the present invention.

As shown in FIG. 8A, the peripheral unit of the present embodiment has a structure in which a write address SD is transmitted as serial data from the CPU unit 2 to each peripheral unit 1 through the signal line 31 via terminal 150. On the other hand, the latch circuit 11a is retaining the unit address as parallel data, and therefore, the write address SD being the serial data is required to be converted into parallel data. Therefore, a serial-to-parallel converter 15 for converting the write address SD into parallel data is provided on the input side of the latch circuit 11a.

Figure 8B:
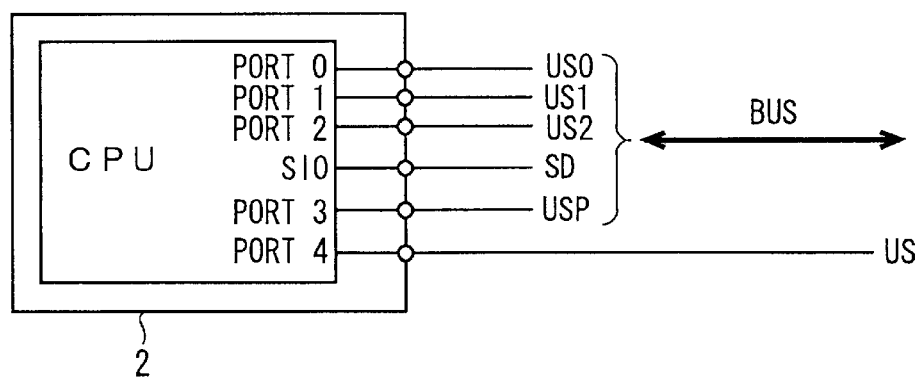

The transmission of the call address US0,US1,US2, the write address SD, the write command signal US and the selection signal USP from the CPU unit 2 in the present embodiment may be achieved in such a manner as shown in FIG. 8B. In FIG. 8B, "SIO" denotes an input/output terminal of a serial I/O device included in the CPU unit 2. The serial I/O device generates the write address SD as serial data and transmits it via the terminal SIO.

The other structure and operation are similar to those of the first embodiment.

Sixth embodiment

Figure 9A:
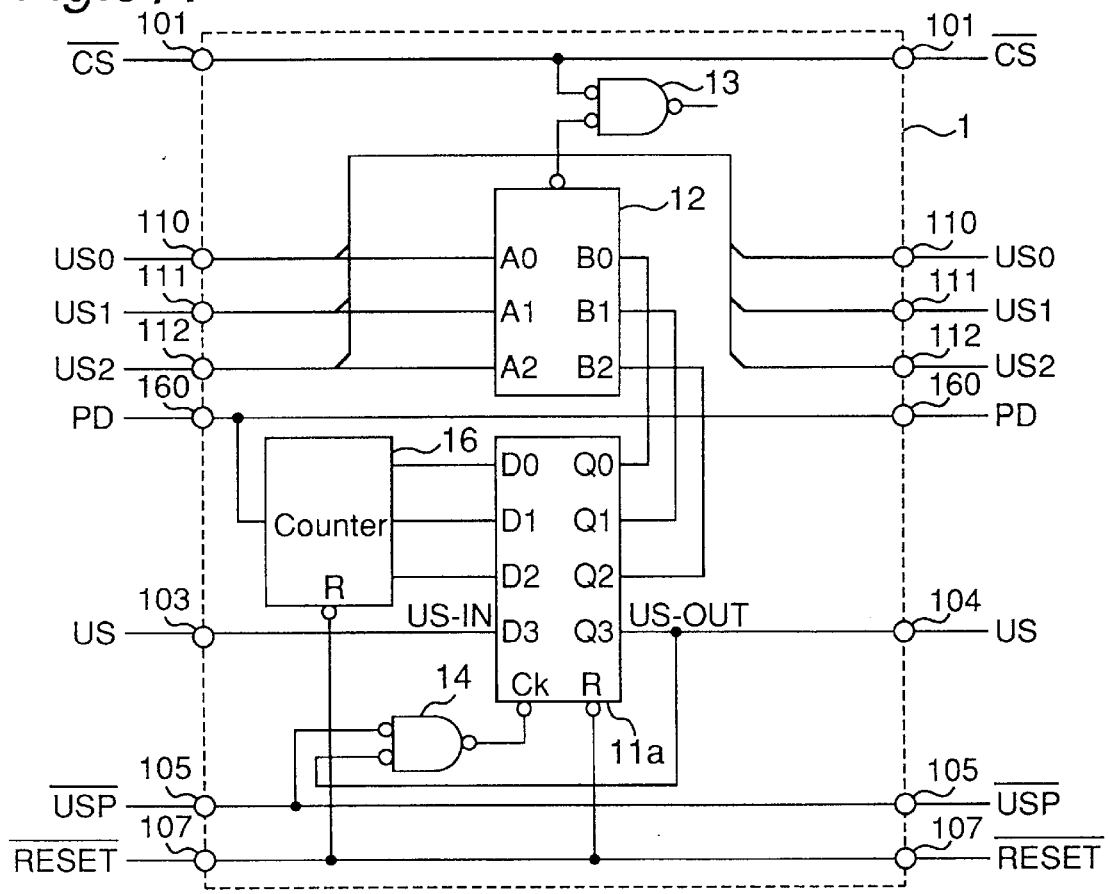
FIGS. 9A,9B are circuit diagrams illustrating interface circuits of a peripheral unit and a CPU unit in the peripheral unit selection system according to the sixth embodiment of the present invention.

As shown in FIG. 9A, the peripheral unit 1 of the present embodiment has a structure in which a counter 16 is provided in place of the serial-to-parallel converter 15 of the fifth embodiment. In the fifth embodiment, the CPU unit 2 generates the write address in the form of serial data. In contrast to the above, in the present embodiment, a pulse signal PD as shown in FIG. 10A is outputted and transmitted from the CPU unit 2 to each peripheral unit 1 through the signal line 31 via terminal 160, the pulse signal PD is counted by the counter 16, and a count value as shown in FIG. 10B obtained by the counter 16 is given as a write address to the latch circuit 11a. In detail, by transmitting the selection signal USP as shown in FIG. 10C from the CPU unit 2 in synchronization with the pulse signal PD (transmitting the selection signal USP after the elapse of a specified time period from the time of transmission of the pulse signal PD), the count value of the counter 16 can be retained in the latch circuit 11a. FIGS. 10D through 10I show the same signals as the signals shown in FIGS. 4C through 4H.

Figure 9B:
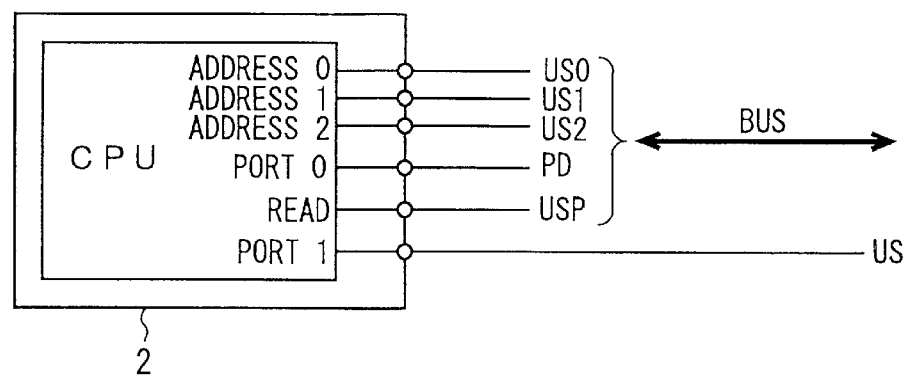

In the present embodiment, the transmission of the call address US0,US1,US2, the pulse signal PD, the write command signal US and the selection signal USP from the CPU unit 2 may be achieved in such a manner as shown in FIG. 9B.

According to the structure of the present embodiment, there is no need to form a write address in the CPU unit 2, and the write address is automatically generated in each peripheral unit 1. Therefore, the unit addresses are set as not overlapped with each other in the peripheral units 1, so that the possible occurrence of erroneous setting of the unit address can be prevented. The other structure and operation are similar to those of the first embodiment.

Seventh embodiment

As shown in FIG. 11, the peripheral unit 1 of the present embodiment has almost the same structure as that of the fourth embodiment, in which an input of the latch circuit 11d is used as one input of the gate circuit 14 instead of using an output of the latch circuit 11d as one input of the gate circuit 14. With this arrangement, in contrast to the structure of the fourth embodiment in which both the inputs of the gate circuit 14 are negative logic inputs, one input terminal to be connected to the input terminal of the latch circuit 11d receives a positive logic input in the present embodiment. Furthermore, for the clock terminal Ck of the latch circuit 11d, there is used not the output of the gate circuit 14 but the selection signal USP.

In the case of the present embodiment, if the write command signal US were retained at H-level, the gate circuit 14 would change its output every time the selection signal USP is inputted, and the latch circuit 11c would change the unit address every time the selection signal USP is outputted from the CPU unit 2. The above means that the unit addresses cannot be individually set in the peripheral units 1. Therefore, as shown in FIG. 12C, the CPU unit 2 makes the write command signal US fall (makes it inactive) after writing one write address into one peripheral unit 1 (refer to FIGS. 12A and 12B). The output of the latch circuit 11d is at H-level at the time point when the selection signal USP is received as shown in FIG. 12D, and therefore, the write command signal US can be transmitted to the peripheral unit 1 in the next stage.

Furthermore, with the input of the selection signal USP to the clock terminal Ck of the latch circuit 11d, when a unit address is set in the peripheral unit 1 in the next stage, the output of the latch circuit 11d comes to have L-level as shown in FIG. 12D, and also the input of the latch circuit 11d of the peripheral unit 1 in the next stage comes to have L-level as shown in FIG. 12E. In this time point, the output of the latch circuit 11d of the peripheral unit 1 in the next stage is at H-level as shown in FIG. 12F, so that the write command signal US can be sequentially transmitted as shown in FIGS. 12G and 12H to the peripheral units 1. The other structure and operation are similar to those of the first embodiment.

Eighth embodiment

Figure 13:
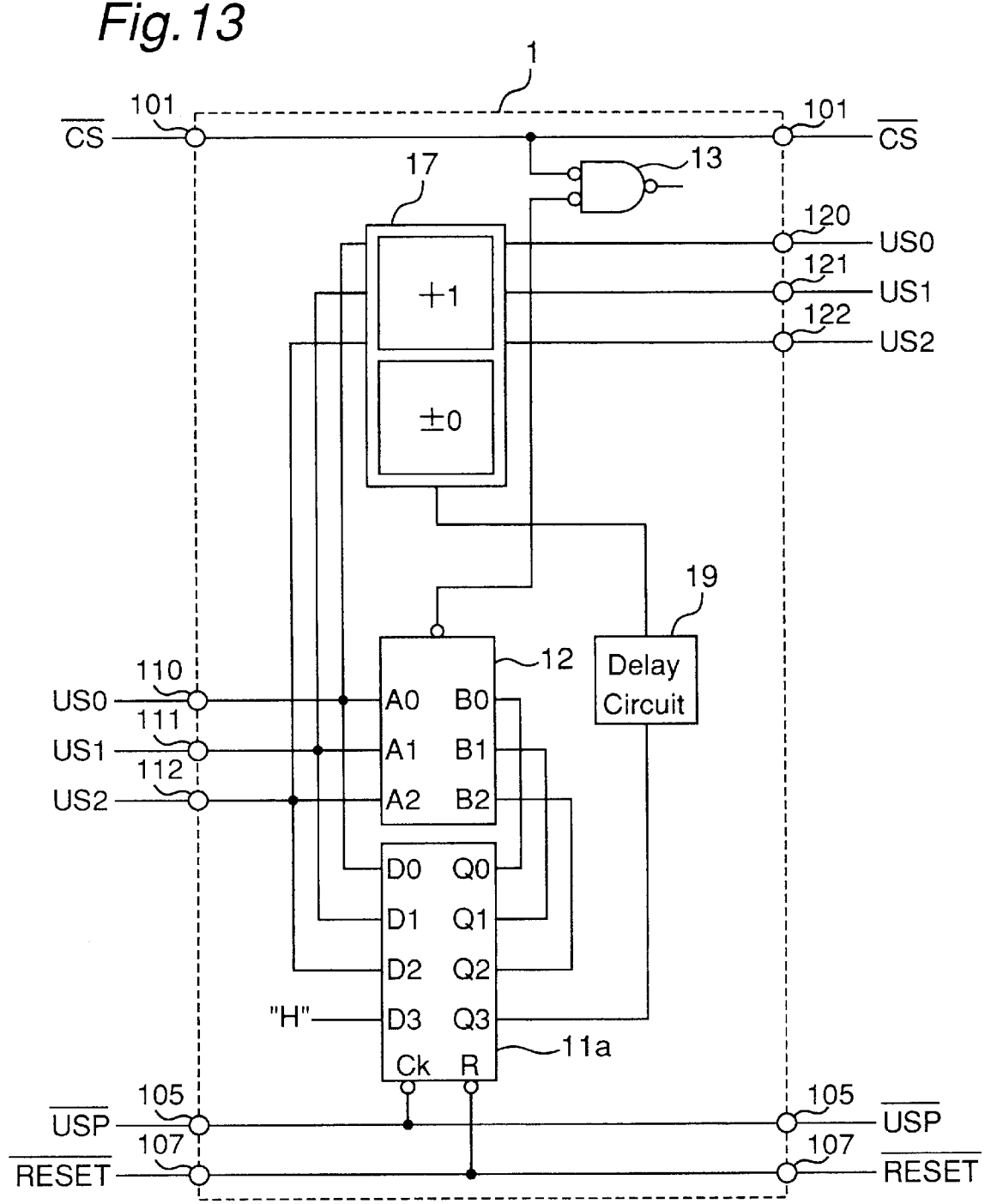
FIG. 13 is a circuit diagram illustrating an interface circuit of a peripheral unit according to the eighth embodiment of the present invention.

As shown in FIG. 13, the peripheral unit 1 of the present embodiment has a structure in which the gate circuit 14 of the second embodiment is eliminated and an H-level (active) signal is always inputted to the input terminal D3 of the latch circuit 11a. The output of the output terminal Q3 of the latch circuit 11a is inputted as a switching signal to an adder circuit 17 through a delay circuit 19. The address signals US0,US1,US2 are inputted not only to the latch circuit 11a and the address comparing circuit 12 but also to the adder circuit 17. The adder circuit 17 becomes active when an L-level signal is inputted as the switching signal from the delay circuit 19 and operates to increment the address signals US0,US1,US2 by one (indicated by the denotation of +1) and output them via terminals 120,121,122. When an H-level signal is inputted as the switching signal, it enters into a through state (indicated by the denotation of ⌽0) to make the address signals US0,US1,US2 pass through it as they are via the terminals 120,121,122. The output of the delay circuit 19 is retained at L-level even when the output from the output terminal Q3 of the latch circuit 11a comes to have H-level by the selection signal USP, and subsequently it comes to have H-level after the elapse of a time not shorter than the interval of generation of the selection signal USP.

Then, in setting a unit address in each peripheral unit 1, for example, "000" is outputted as the address signals US0,US1,US2 from the CPU unit 2 to intermittently generate a selection signal USP similarly to the first embodiment. The latch circuit 11a provided with the selection signal USP retains the address signals US0,US1,US2 as the unit address and outputs an H-level signal from the output terminal Q3. At this time point, a signal obtained by adding one to the address signals US0,US1,US2 using the adder circuit 17 is transmitted to the peripheral unit 1 in the next stage. After the next selection signal USP is inputted and the value obtained through the addition is set as the unit address in the peripheral unit 1 in the next stage, the switching signal i.e. the output of the delay circuit 19 comes to have H-level to put the adder circuit 17 into a through state. That is, the adder circuit 17 is put into a state in which it makes the address signal from the CPU unit 2 pass through it.

Each unit address is thus set by transmitting the address signals US0,US1,US2 through successive addition to the peripheral unit 1 in the next stage. After the unit address setting, the signal line functions similarly to the signal line that is not provided with the adder circuit 17 since the adder circuit 17 enters into the through state.

In the above example, the address signals US0,US1,US2 are incremented in the adder circuit 17. However, it is acceptable to adopt a structure in which the signals are decremented by one, output, for example, "111" as the address signals US0,US1,US2 from the CPU unit 2 and set decreasing unit addresses in the peripheral units 1 in the order of increasing distance from the CPU unit 2.

Ninth embodiment

Figure 14A:
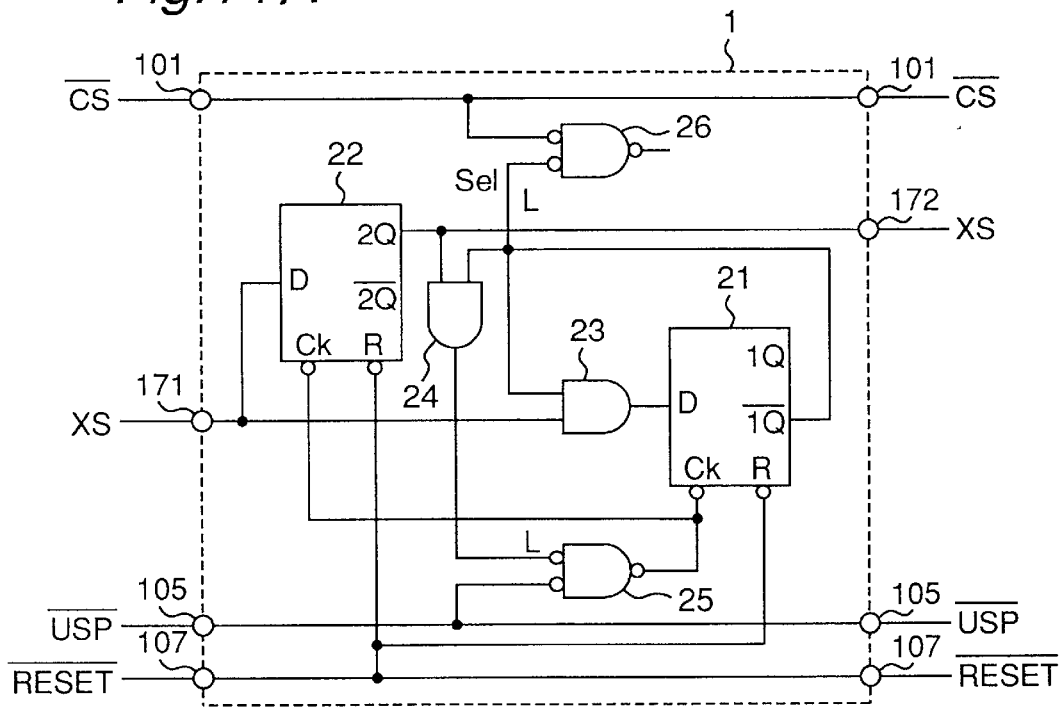
FIGS. 14A,14B are circuit diagrams illustrating interface circuits of a peripheral unit and a CPU unit in the peripheral unit selection system according to the ninth embodiment of the present invention.

The peripheral unit 1 of the present embodiment has a structure in which the peripheral units 1 are selected in the order in which the peripheral units are connected to the CPU unit 2 without setting any address in the peripheral units 1. That is, as shown in FIG. 14A, each peripheral unit 1 is provided with two latch circuits 21 and 22, and the latch circuit 21 is a edge-triggered flip-flip. Each peripheral unit 1 is further provided with an AND circuit 23 which obtains a logical product of an H-level selection command signal XS transferred from the CPU unit 2 to the peripheral unit 1 via terminal 171 and an inverted output of the latch circuit 21 and inputs the logical product to the latch circuit 21, and an AND circuit 24 which obtains a logical product of the inverted output of the latch circuit 21 and a non-inverted output of the latch circuit 22. The output of the AND circuit 24 is inputted to a gate circuit 25, and when the output of the AND circuit 24 is at L-level, the selection signal USP transmitted from the CPU unit 2 passes through the gate circuit 25. The output of the gate circuit 25 is inputted to the clock terminal Ck of the latch circuits 21 and 22. Further, a gate circuit 26 to which the inverted output of the latch circuit 21 and the select signal CS are inputted is provided, and the gate circuit 26 makes the select signal CS pass through it when the inverted output of the latch circuit 21 is at L-level. The gate circuit 26 has a function similar to that of the gate circuit 13 of the first embodiment, and when the output of the gate circuit 26 comes to have L-level (active), access to the peripheral unit 1 is permitted.

Figure 15D:

Then, an H-level selection command signal XS is outputted from the CPU unit 2 to the latch circuit 22 and the AND circuit 23 after the reset signal RESET is outputted. At this time point, the non-inverted output of the latch circuit 22 is at L-level, and the output of the AND circuit 24 is also at L-level. Therefore, when the selection signal USP as shown in FIG. 15A is transmitted from the CPU unit 2, the selection signal USP passes through the gate circuit 25. That is, when the selection signal USP is outputted, the output of the gate circuit 25 changes, and at the time point when the input to the clock terminal Ck of the latch circuits 21 and 22 rises, each of the latch circuits 21 and 22 latches H-level as shown in FIGS. 15C and 15D. Therefore, the non-inverted output of the latch circuit 21 comes to have L-level, and the gate circuit 26 permits the select signal CS to pass through it. At this time, the non-inverted output of the latch circuit 22 is transferred as an input to the latch circuit 22 of the peripheral unit 1 in the next stage via terminal 172.

At this time point, the output of the AND circuit 24 is at L-level, and therefore, the gate circuit 25 still allows the selection signal USP to pass through it. When the selection signal USP is inputted to the gate circuit 25 in the next time, the signal to the clock terminal Ck of the latch circuits 21 and 22 rises. Since the inverted output of the latch circuit 21 is at L-level, the output of the AND circuit 23 is also at L-level. With the input of the selection signal USP, the inverted output of the latch circuit 21 comes to have H-level (refer to FIG. 15C). That is, the output of the AND circuit 24 comes to have H-level, and both the gate circuits 25 and 26 disable the passing of the select signal CS and the selection signal USP through them.

Figure 15F:
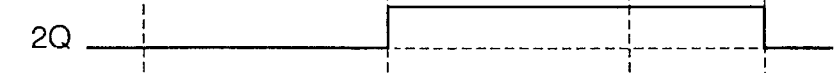
Figure 15H:

Further, in the peripheral unit 1 of the next stage, since the aforementioned operation is executed at this time point, the gate circuit 26 is opened (refer to FIGS. 15E and 15F) to permit the select signal CS to pass through it. That is, when the passing of the select signal CS is enabled in the peripheral unit 1 of the second stage, the select signal CS does not pass in the peripheral unit 1 of the first stage, and subsequently only the peripheral unit 1 of the stage equal in ordinal number to the number of the selection signals USP permits the select signal CS to pass through it in an alternative way in a similar operation (the peripheral unit of the third stage comes to have the state as shown in FIGS. 15G and 15H).

Figure 14B:
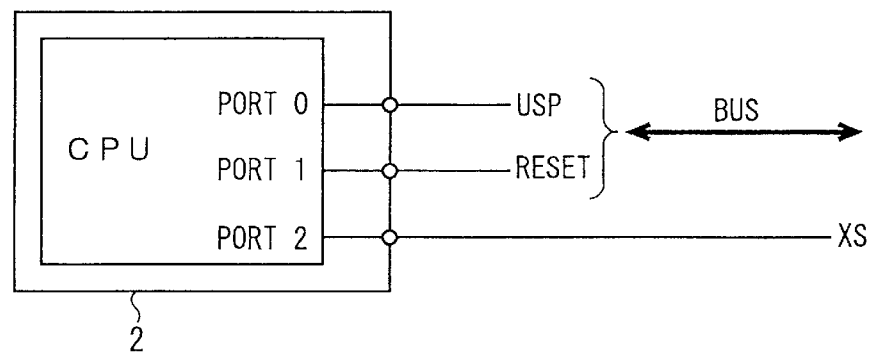

In the present embodiment, the transmission of the selection command signal XS, the selection signal US and the reset signal RESET from the CPU unit 2 may be achieved in such a manner as shown in FIG. 14B.

As described above, a peripheral unit 1 is designated by the number of selection signals USP in the present embodiment. Accordingly, there is no need to set an address in each peripheral unit 1, and the number of signal lines 3 becomes smaller than in the case where address setting is performed. When selecting another peripheral unit 1 after selecting a peripheral unit 1, it is proper to repeat the aforementioned operation after transmitting the reset signal RESET as shown in FIG. 15B. Furthermore, although H-level is assumed to be active for a selection command signal in the aforementioned embodiment, it is acceptable to construct a circuit in which L-level is assumed to be active. Furthermore, the latch circuits 21 and 22 can be replaced by D-type flip-flops.

Tenth embodiment

Figures 16, 17D, 17G, 17J:
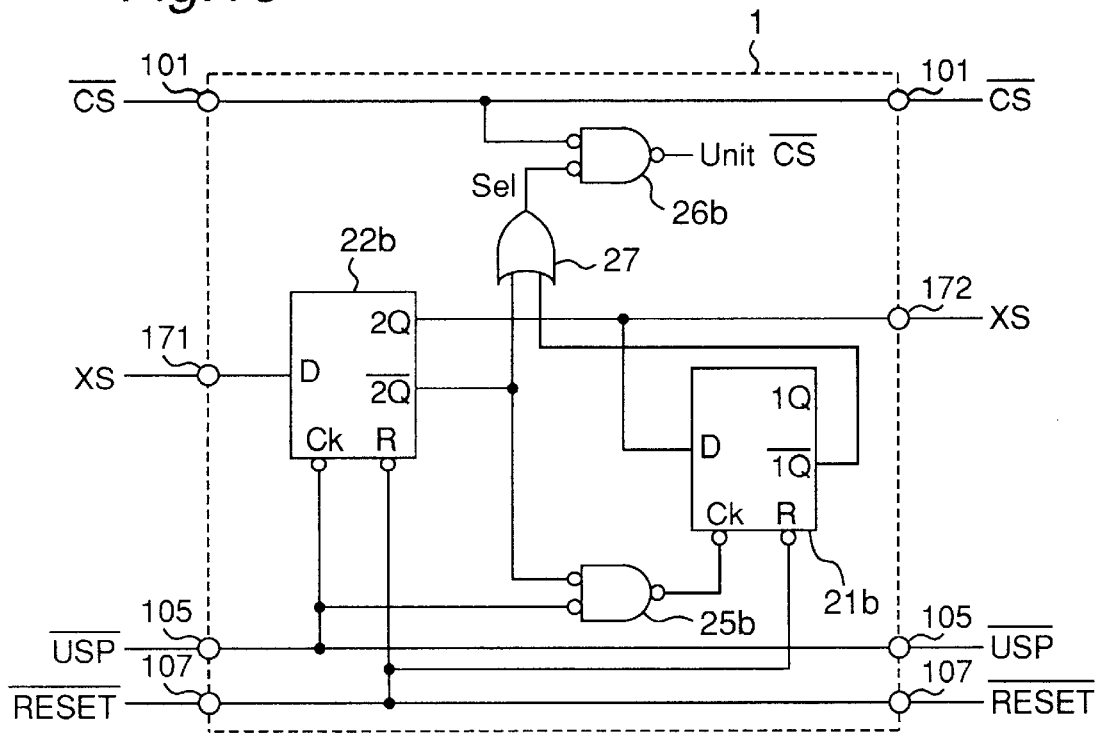

The present embodiment operates almost similarly to the ninth embodiment, and it is comprised of two latch circuits 21b and 22b, two gate circuits 25b and 26b, and one OR circuit 27 as shown in FIG. 16. The latch circuit 22b latches the selection command signal (H-level) XS from the CPU unit 2 at the rise time of the selection signal USP, and a non-inverted output of it is transmitted to the latch circuit 22b of the peripheral unit 1 of the next stage. Further, the latch circuit 21b latches a non-inverted input of the latch circuit 22b. To the clock terminal Ck of the latch circuit 21b is inputted the output of the gate circuit 25b to which the inverted output of the latch circuit 22b and the selection signal USP are inputted. The gate circuit 25b allows the selection signal USP to pass through it when the non-inverted output of the latch circuit 22b is at L-level. Further, a non-inverted output of the latch circuit 21b and an inverted output of the latch circuit 22b are inputted to the OR circuit 27. When the output of the OR circuit 27 is at L-level, the gate circuit 26b makes the select signal CS pass through it.

Assuming now that the selection signal USP is intermittently outputted from the CPU unit 2 as shown in FIG. 17A, the non-inverted output of the latch circuit 21b is at L-level and the inverted output of the latch circuit 22b is at H-level in the peripheral unit 1 of the first stage before the selection signal USP is inputted, as shown in FIGS. 17D and 17E. Therefore, as shown in FIG. 17C, the output Sel of the OR circuit 27 is at H-level, and the gate circuit 26b is put in a state in which it prevents the select signal CS from passing through it. Subsequently, when the selection signal USP is inputted, the non-inverted output of the latch circuit 22b comes to have H-level to transmit the selection command signal XS to the peripheral unit 1 of the next stage via terminal 172. Further, the selection signal USP does not pass through the gate circuit 25b, and therefore, the output of the latch circuit 21b does not change. However, when the inverted output of the latch circuit 22b comes to have L-level, the gate circuit 25b allows the next selection signal USP to pass through it. Hence, both the non-inverted output of the latch circuit 21b and the inverted output of the latch circuit 22b come to have L-level. Consequently, the output Sel of the OR circuit 27 comes to have L-level, so that the gate circuit 26b permits the select signal CS to pass through it.

When the selection signal USP is continuously outputted from the CPU unit 2, upon the input of the next selection signal USP, the selection signal USP is inputted to the clock terminal Ck of the latch circuit 21b through the gate circuit 25b. At this time point, the output of the latch circuit 22b inputted to an input terminal D of the latch circuit 21b is at H-level. Consequently, the non-inverted output of the latch circuit 21b comes to have H-level and the output Sel of the OR circuit 27 comes to have H-level, so that the gate circuit 26b prevents the select signal CS from passing through it.

Further, the peripheral unit 1 of the next stage operates as shown in FIGS. 17F, 17G and 17H by this selection signal USP to permit the select signal CS to pass through it. Likewise, the peripheral unit 1 of the third stage operates as shown in FIGS. 17I, 17J and 17K. Thus, only the peripheral unit 1 located in the position corresponding to the number of selection signals USP permits the select signal CS to pass through it. The other structure and operation of the present embodiment are similar to those of the ninth embodiment.

Eleventh embodiment

Figure 18:
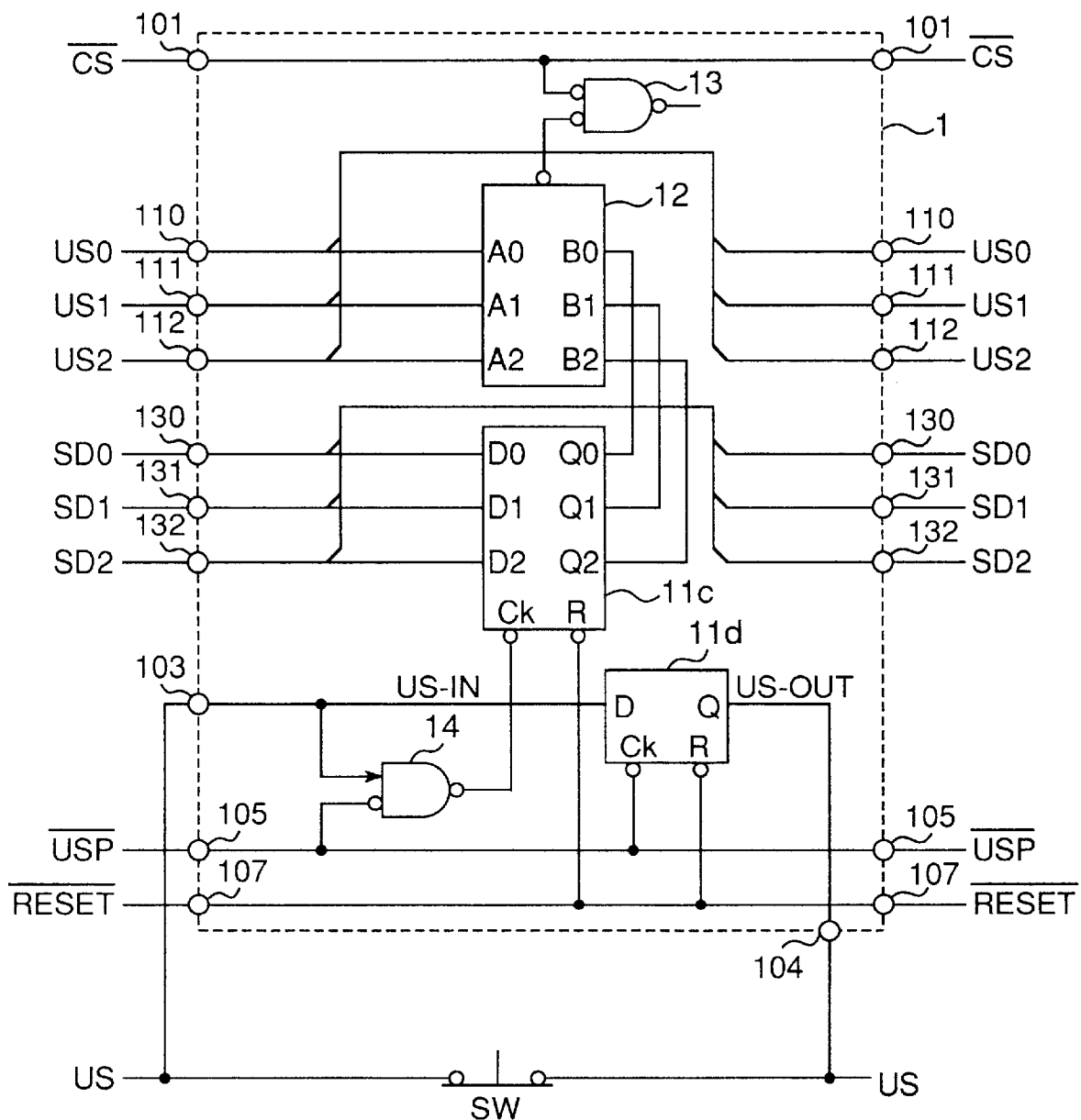
FIG. 18 is a circuit diagram illustrating the eleventh embodiment of the present invention.
Figure 19:
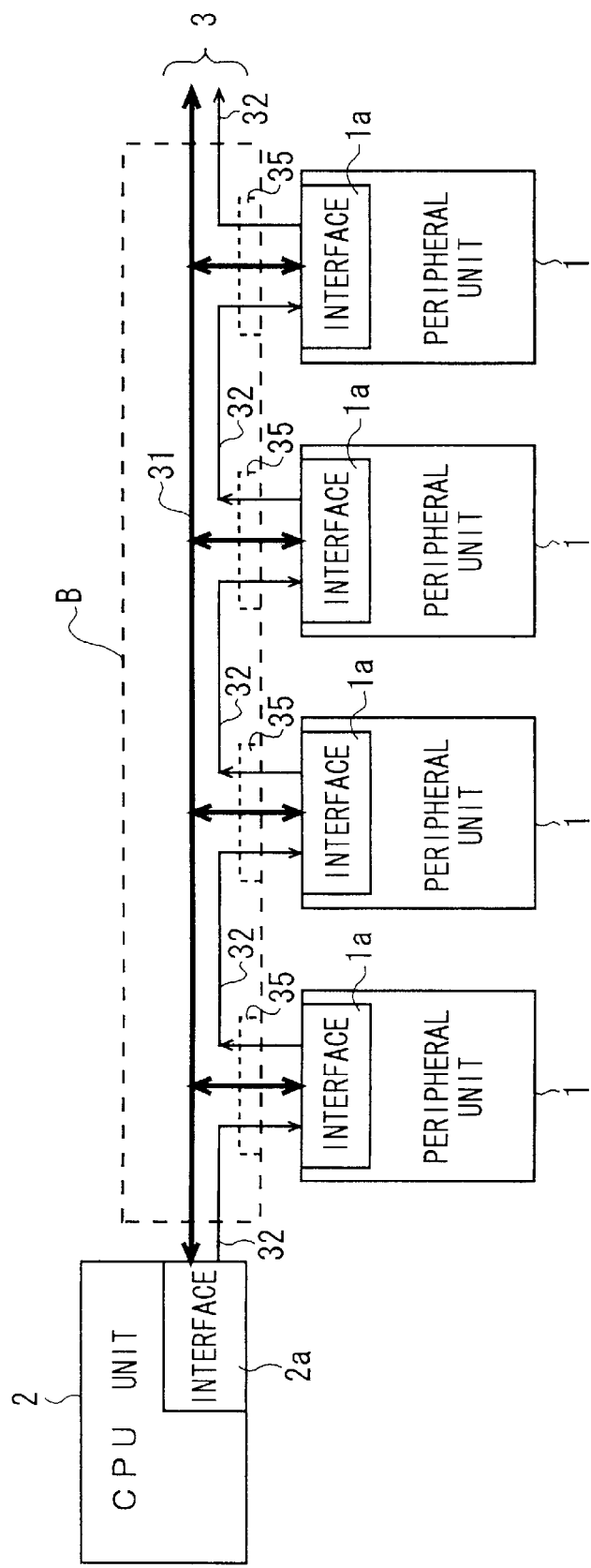
FIG. 19 is a block diagram illustrating a peripheral unit selection system according to the eleventh embodiment.

As shown in FIG. 18, the present embodiment has a structure based on the seventh embodiment shown in FIG. 11, in which a switch SW is incorporated between the input terminal D and the output terminal Q of the latch circuit 11d. In the present embodiment as shown in FIG. 19, the signal line 3 for connecting the CPU unit 2 with each peripheral unit 1 is formed on a mother board B. That is, the first signal line 31 for bus connection and the second signal line 32 for cascade connection are formed on a mother board B as shown in FIG. 19, allowing a system to be constructed by, for example, mounting a peripheral unit 1 into a unit mounting slot 35 provided at the mother board B. The switch SW is provided on the mother board B, and the switch SW is kept ON or conductive in a state in which no peripheral unit 1 is mounted, so that the write command signal US can be transferred.

That is, the second signal line 32 for transmitting the write command signal US is not connected by bus connection. Therefore, when a unit mounting slot 35 mounted with no peripheral unit 1 exists in the structure as shown in FIG. 19, the write command signal US cannot be transmitted in the structure of the seventh embodiment even if a peripheral unit 1 is mounted in a unit mounting slot 35 on the subsequent stage side. In view of the above, by providing the switch SW, the write command signal US is allowed to be transmitted without being made to pass through a peripheral unit 1 in the portion provided with no peripheral unit 1. The other structure and operation are similar to those of the seventh embodiment.

Twelfth embodiment

Figure 20:
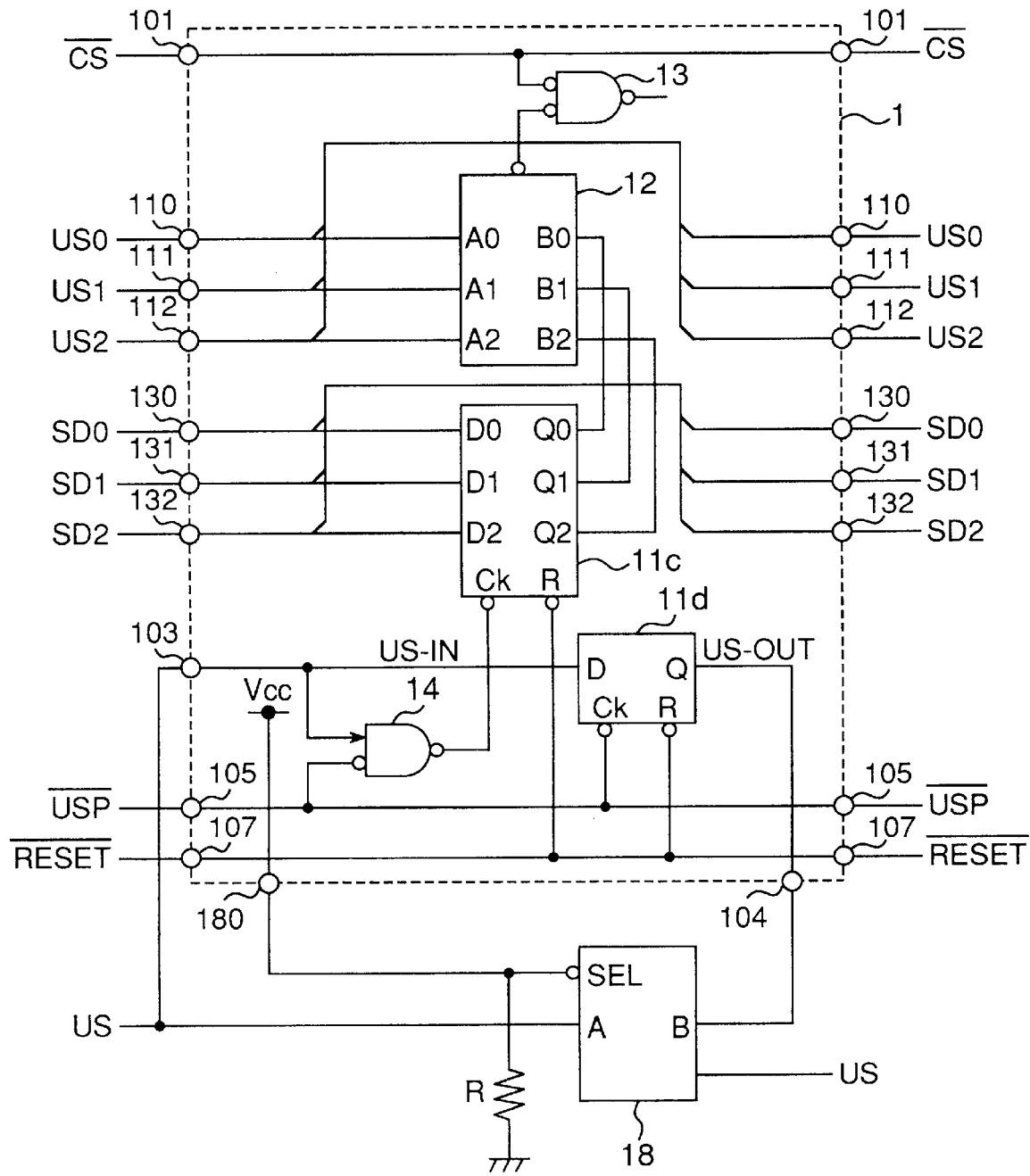
FIG. 20 is a circuit diagram illustrating the twelfth embodiment of the present invention.

As shown in FIG. 20, the present embodiment has a structure in which a selector 18 is provided in place of the switch SW in the eleventh embodiment. This selector 18 outputs a signal at its input terminal A when a switching signal inputted to its terminal SEL is at L-level, and outputs a signal at its input terminal B when the switching signal is at H-level. To the terminal SEL is connected a pull-down resistor R, and a power supply voltage Vcc (i.e., H-level) is applied as the switching signal to one end of the pull-down resistor R via terminal 180 when a peripheral unit 1 is mounted.

Therefore, when no peripheral unit 1 is mounted in the corresponding unit mounting slot 35 on the mother board B, the switching signal to the terminal SEL comes to have L-level by the pull-down resistor R, and the input signal to the input terminal A is outputted. In other words, the write command signal US passes through the selector 18 in the state in which no peripheral unit 1 is mounted in the corresponding unit mounting slot 35. When a peripheral unit 1 is mounted in the unit mounting slot 35, the H-level switching signal is inputted to the terminal SEL, and the write command signal US that has passed through the peripheral unit 1 passes through the selector 18. The other structure and operation are similar to those of the seventh embodiment.

Thirteenth embodiment

Figure 21:
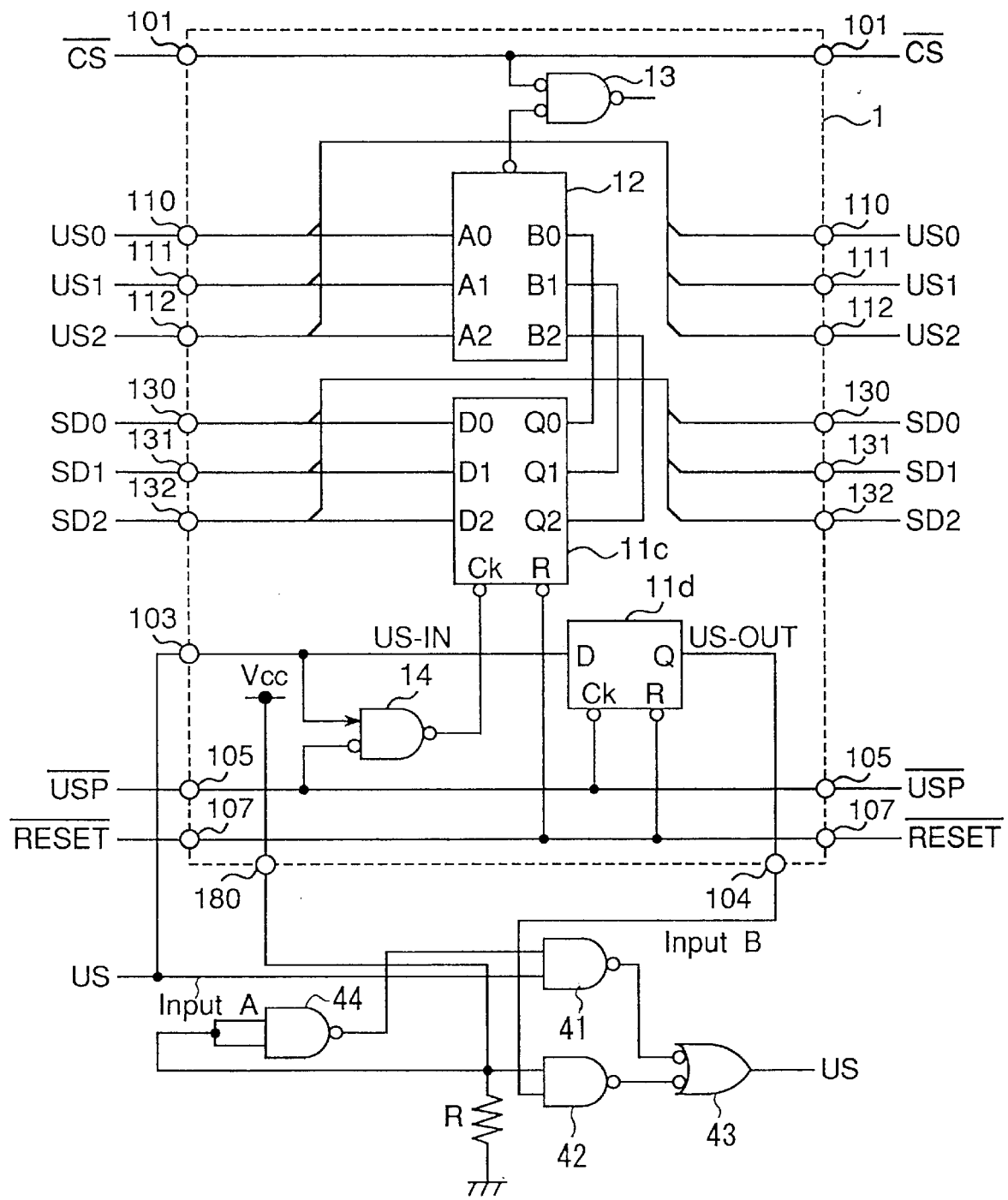
FIG. 21 is a circuit diagram illustrating the thirteenth embodiment of the present invention.

As shown in FIG. 21, the present embodiment has a structure in which the same function as that of the selector 18 of the twelfth embodiment is implemented by a logic circuit, which is comprised of four NAND circuits 41 through 44. One NAND circuit 44 is made to function as an inverter circuit by short-circuiting its input terminals. The write command signal US and the output of the NAND circuit 44 are inputted to the NAND circuit 41. To the NAND circuit 42 is connected one end of a pull-down resistor R and inputted the output of the latch circuit 11d. That is, one terminal of the NAND circuit 41 functions as the input terminal A, one terminal of the NAND circuit 42 functions as the input terminal B, and the other terminal of the NAND circuit 42 functions as the terminal SEL. The outputs of the NAND circuits 41 and 42 are inputted to the NAND circuit 43, and the NAND circuit 43 forms an output to the peripheral unit 1 of the next stage. The input terminals of the NAND circuit 44 are connected to one input terminal of the NAND circuit 42 and function as the terminal SEL.

Hence, in the state in which no peripheral unit 1 is mounted in the corresponding unit mounting slot 35 on the mother board B, the outputs of the NAND circuits 42 and 44 are at H-level. Therefore, the write command signal US is inverted in the NAND circuit 41 and inverted again in the NAND circuit 43 to pass as it is. On the other hand, when a peripheral unit 1 is mounted, the output of the NAND circuit 44 comes to have L-level. Consequently, the write command signal US cannot pass through the NAND circuit 41, and the NAND circuit 42 makes the output of the latch circuit 11d pass through it. Therefore, with the arrangement that the output of the latch circuit 11d is inverted in the NAND circuit 42 and inverted again in the NAND circuit 43, the output of the latch circuit 11d can be transmitted to the peripheral unit 1 of the next stage. The other structure and operation are similar to those of the seventh embodiment.

Fourteenth embodiment

Figure 22:
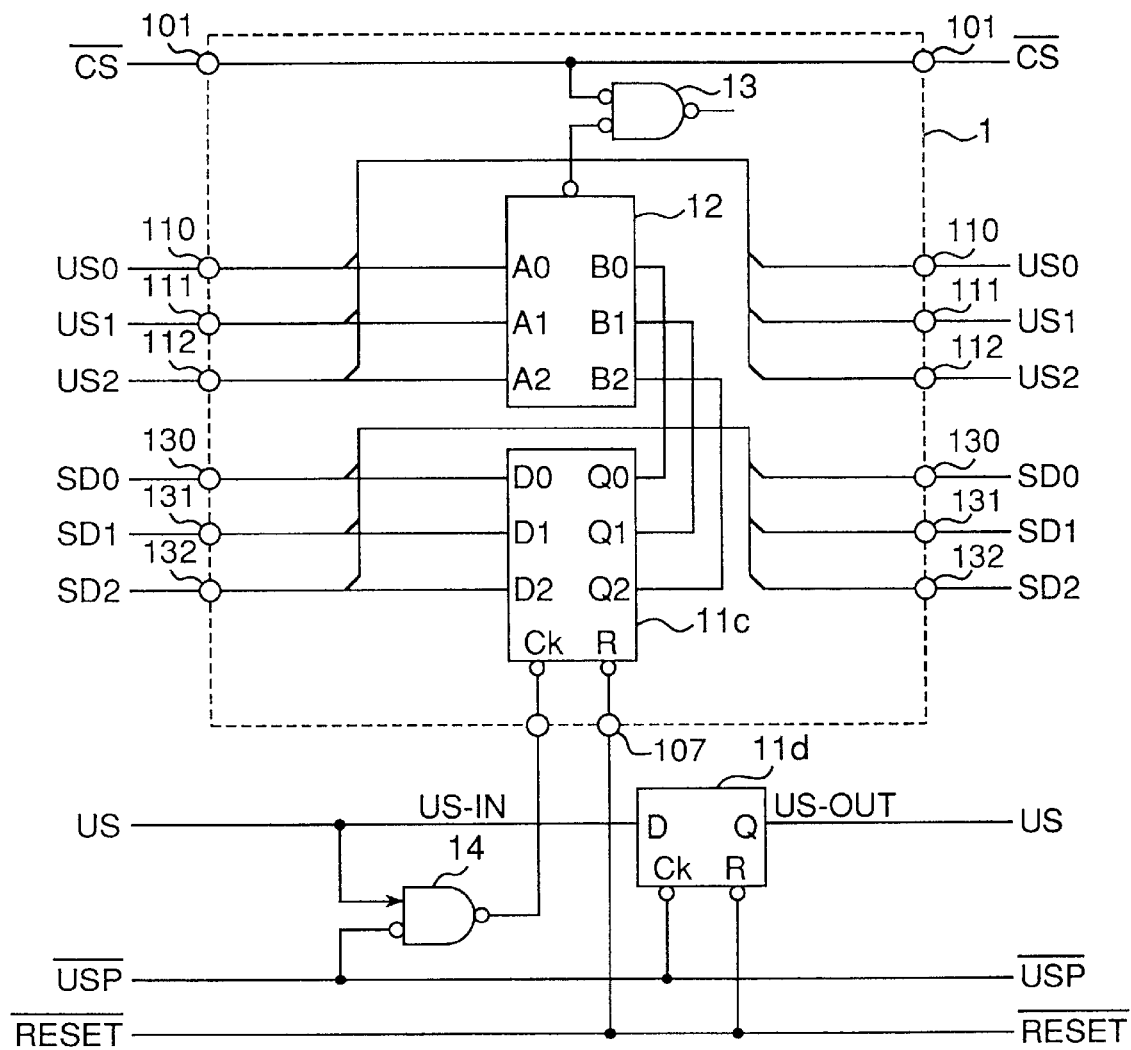
FIG. 22 is a circuit diagram illustrating the fourteenth embodiment of the present invention.

As shown in FIG. 22, the present embodiment has the same circuit structure as that of the seventh embodiment shown in FIG. 11, in which the gate circuit 14 and the latch circuit 11d are provided on the mother board B. That is, according to this structure, the function of individually selecting the peripheral units 1 when its unit address is not yet set is not provided in the peripheral units 1 but on the mother board B. Therefore, the write command signal US can be sequentially transmitted via the latch circuit 11d regardless of the presence or absence of any peripheral unit 1. Furthermore, since the latch circuit 11d is provided in the portion in which each peripheral unit 1 is to be mounted, the position of selection of the mother board B can be known by the output of the latch circuit 11d. That is, by sending back the connection state of each peripheral unit 1 when selecting the unit mounting slot 35 in each position, whether or not the peripheral unit 1 is mounted can be also detected. The other structure and operation are similar to those of the seventh embodiment.

It is to be noted that the signal line 31 is connected to the CPU unit 2 by bus connection regardless of the presence or absence of each peripheral unit 1 in the eleventh embodiment through fourteenth embodiment.

What is claimed is:

1. A peripheral unit selection system having a plurality of peripheral units and a CPU unit, said peripheral unit selection system comprising:
   a first signal line for directly connecting the CPU unit with the plurality of peripheral units;
   a second signal line for connecting in cascade the CPU unit and the plurality of peripheral units;
   first interface means provided in the CPU unit for transmitting a selection signal and a write address to the first signal line and transmitting a write command signal to the second signal line to set an address for each of the peripheral units, and for transmitting a call address to the first signal line to select the peripheral units individually; and
   second interface means provided in each of the peripheral units, comprising:
      address setting means for storing the write address transmitted together with the selection signal through the first signal line from the CPU unit as a unit address;
      signal transmitting means for transmitting the write command signal transferred through the second signal line from the CPU unit sequentially to the peripheral unit of a subsequent stage every time the selection signal is received;
      gate means for inhibiting the selection signal from being received in response to the transmission of the write command signal to the peripheral unit of the subsequent stage; and
      access permitting means for comparing the call address transmitted from the CPU unit through the first signal line with the unit address set in the address setting means and permitting access from the CPU unit when the addresses coincide with each other.

2. A peripheral unit in a peripheral unit selection system having a plurality of peripheral units and a CPU unit, said peripheral unit comprising:
   bus connection terminals for inputting a write address, call address and selection signal which are transmitted from the CPU unit through a first signal line for directly connecting the CPU unit with the plurality of peripheral units;
   a pair of cascade connection terminals having an input terminal for inputting a write command signal transmitted from the CPU unit through a second signal line for connecting in cascade the CPU unit and the plurality of peripheral units, and an output terminal for outputting a signal based on the write command signal to the peripheral unit of a subsequent stage as a write command signal;
   address setting means for storing the write address transmitted together with the selection signal through the first signal line from the CPU unit as a unit address;
   signal transmitting means for transmitting the write command signal transferred through the second signal line from the CPU unit sequentially to the peripheral unit of the subsequent stage every time the selection signal is received;
   gate means for inhibiting the selection signal from being received in response to the transmission of the write command signal to the peripheral unit of the subsequent stage; and
   access permitting means for comparing the call address transmitted from the CPU unit with the unit address set in the address setting means and permitting access from the CPU unit when the addresses coincide with each other.

3. A peripheral unit as claimed in claim 2,
   wherein the first signal line comprises individual lines for transmitting the call address and the write address,
   the address setting means and the signal transmitting means comprise a latch circuit for latching the write address and the write command signal when the selection signal is inputted, and
   the gate means comprises a gate circuit for inhibiting the selection signal from being inputted to the latch circuit upon receiving the write command signal latched in the latch circuit.

4. A peripheral unit as claimed in claim 2,
   wherein the first signal line comprises a common line for transmitting the call address and the write address,
   the address setting means and the signal transmitting means comprises a latch circuit for latching the write address and the write command signal when the selection signal is inputted, and
   the gate means comprises a gate circuit for inhibiting the selection signal from being inputted to the latch circuit upon receiving the write command signal latched in the latch circuit.

5. A peripheral unit as claimed in claim 2,
   wherein the address setting means comprises a first latch circuit for latching the write address when the selection signal is inputted,
   the signal transmitting means comprises a second latch circuit for latching the write command signal and outputting the latched signal to the peripheral unit of the subsequent stage as a write command signal when the selection signal is inputted, and
   the gate means comprises a gate circuit for inhibiting the selection signal from being inputted to the first and second latch circuits upon receiving the write command signal latched in the second latch circuit.

6. A peripheral unit as claimed in claim 2,
wherein the first signal line comprises a parallel transmission line for transmitting the call address as parallel data and a serial transmission line for transmitting the write address as serial data;
the address setting means comprises
a serial-to-parallel converter circuit for converting the write address of the serial data inputted from the serial transmission line into parallel data, and
a first latch circuit for latching the write address of the parallel data outputted from the serial-to-parallel converter circuit when the selection signal is inputted;
the signal transmitting means comprises a second latch circuit for latching the write command signal transmitted from the CPU unit when the selection signal is inputted; and
the gate means comprises a gate circuit for inhibiting the selection signal from being inputted to the first and second latch circuits upon receiving the write command signal latched in the second latch circuit.

7. A peripheral unit selection system having a plurality of peripheral units and a CPU unit, said peripheral unit selection system comprising:
a first signal line for directly connecting the CPU unit with the plurality of peripheral units;
a second signal line for connecting in cascade the CPU unit and the plurality of peripheral units;
first interface means provided in the CPU unit for transmitting a selection signal and a pulse signal synchronized with the selection signal to the first signal line and transmitting a write command signal to the second signal line to set an address for each of the peripheral units, and for transmitting a call address to the first signal line to select the peripheral units individually; and
second interface means provided in each of the peripheral units, comprising:
a counter for counting pulse signals transmitted from the CPU unit;
a latch circuit for latching an output value of the counter as a unit address and for latching the write command signal transmitted from the CPU unit and outputting the latched signal to the peripheral unit of a subsequent stage as a write command signal, when the selection signal is inputted;
a gate circuit for inhibiting the selection signal from being inputted to the latch circuit upon receiving the write command signal latched in the latch circuit when the write command signal is transmitted to the peripheral unit of the subsequent stage with the latching of the write command signal in the latch circuit; and
access permitting means for comparing the call address transmitted from the CPU unit with the unit address set in the latch circuit and permitting access from the CPU unit when the addresses coincide with each other.

8. A peripheral unit in a peripheral unit selection system having a plurality of peripheral units and a CPU unit, said peripheral unit comprising:
bus connection terminals for inputting a call address, selection signal and pulse signal synchronized with the selection signal which are transmitted from the CPU unit through a first signal line for directly connecting the CPU unit with the plurality of peripheral units;
a pair of cascade connection terminals having an input terminal for inputting a write command signal transmitted from the CPU unit through a second signal line for connecting in cascade the CPU unit and the plurality of peripheral units, and an output terminal for outputting a signal based on the write command signal to the peripheral unit of a subsequent stage as a write command signal;
a counter for counting pulse signals transmitted from the CPU unit;
a latch circuit for latching an output value of the counter as a unit address and for latching the write command signal transmitted from the CPU unit and outputting the latched signal to the peripheral unit of the subsequent stage as a write command signal, when the selection signal is inputted;
a gate circuit for inhibiting the selection signal from being inputted to the latch circuit upon receiving the write command signal latched in the latch circuit when the write command signal is transmitted to the peripheral unit of the subsequent stage with the latching of the write command signal in the latch circuit; and
access permitting means for comparing the call address transmitted from the CPU unit with the unit address set in the latch circuit and permitting access from the CPU unit when the addresses coincide with each other.

9. A peripheral unit in a peripheral unit selection system having a plurality of peripheral units and a CPU unit, said peripheral unit comprising:
bus connection terminals for inputting a write address, call address and selection signal which are transmitted from the CPU unit through a first signal line for directly connecting the CPU unit with the plurality of peripheral units;
a pair of cascade connection terminals having an input terminal for inputting a write command signal transmitted from the CPU unit through a second signal line for connecting in cascade the CPU unit and the plurality of peripheral units, and an output terminal for outputting a certain signal based on the write command signal to the peripheral unit of a subsequent stage as a write command signal;
a first latch circuit for latching the write address as a unit address when the selection signal is inputted;
a second latch circuit for latching the write command signal transmitted from the CPU unit and outputting the latched signal to the peripheral unit of the subsequent stage as a write command signal, when the selection signal is inputted;
a gate circuit for inhibiting the selection signal from being inputted to the first latch circuit upon receiving the write command signal inputted to the second latch circuit; and
access permitting means for comparing the call address transmitted from the CPU unit with the unit address latched in the first latch circuit and permitting access from the CPU unit when the addresses coincide with each other.

10. A peripheral unit selection system having a plurality of peripheral units and a CPU unit, said peripheral unit selection system comprising:
a first signal line for directly connecting the CPU unit with the plurality of peripheral units;
a second signal line for directly connecting in cascade the CPU unit and the plurality of peripheral units;

first interface means provided in the CPU unit for transmitting a selection signal to the first signal line to set an address for each of the peripheral units, and for transmitting an address to the second signal line to set an address for each of the peripheral units and to select the peripheral units individually;

second interface means provided in each of the peripheral units, comprising:

a latch circuit for latching the address transmitted from the CPU unit as a unit address every time the selection signal transmitted from the CPU unit is inputted;

an arithmetic circuit for outputting a value obtained by subjecting the address transferred from the CPU unit to addition or subtraction with a specified value to the peripheral unit of a subsequent stage as an address when no unit address is set in the latch circuit, and outputting the address transferred from the CPU unit to the peripheral unit of the subsequent stage as an address when a unit address is set; and access permitting means for comparing the address transferred from the CPU unit through the second signal line with the unit address set in the latch circuit and permitting access from the CPU unit when the addresses coincide with each other.

11. A peripheral unit in a peripheral unit selection system having a plurality of peripheral units and a CPU unit, said peripheral unit comprising:

bus connection terminals for inputting a selection signal which is transmitted from the CPU unit through a first signal line for directly connecting the CPU unit with the plurality of peripheral units;

cascade connection terminals having input terminals for inputting an address transmitted from the CPU unit through a second signal line for connecting in cascade the CPU unit and the plurality of peripheral units, and output terminals for outputting a certain signal based on the address to the peripheral unit of a subsequent stage as an address;

a latch circuit for latching the address transmitted from the CPU unit as a unit address every time the selection signal transmitted from the CPU unit is inputted;

an arithmetic circuit for outputting a value obtained by subjecting the address transferred from the CPU unit to addition or subtraction with a specified value to the subsequent peripheral unit as an address when no unit address is set in the latch circuit, and outputting the address transferred from the CPU unit to the peripheral unit of the subsequent stage as an address when a unit address is set; and access permitting means for comparing the address transferred from the CPU unit through the second signal line with the unit address set in the latch circuit and permitting access from the CPU unit when the addresses coincide with each other.

12. A peripheral unit selection system having a plurality of peripheral units and a CPU unit, said peripheral unit selection system comprising:

a first signal line for directly connecting the CPU unit with the plurality of peripheral units;

a second signal line for connecting in cascade the CPU unit and the plurality of peripheral units;

first interface means provided in the CPU unit for transmitting a reset signal to the first signal line to initialize the operation of selection of the peripheral units, and for transmitting selection signals the number of which corresponds to the peripheral unit to be selected to the first signal line and transmitting a selection command signal to the second signal line to select the peripheral units individually;

second interface means provided in each of the peripheral units, comprising:

signal transmitting means for transmitting the selection command signal to the peripheral unit of a subsequent stage via the second signal line on receiving the selection signal transmitted from the CPU unit while the selection command signal is inputted from the CPU unit side via the second signal line;

access permitting means for permitting access from the CPU unit by the selection signal before transmitting the selection command signal to the peripheral unit of the subsequent stage and for inhibiting access from the CPU unit when the selection signal is inputted after transmitting the selection command signal;

gate means for inhibiting the selection signal from being received when the selection signal is inputted after transmitting the selection command signal to the peripheral unit of the subsequent stage; and reset means for resetting each of the signal transmitting means, the access permitting means and the gate means to an initial state by the reset signal.

13. A peripheral unit in a peripheral unit selection system having a plurality of peripheral units and a CPU unit, said peripheral unit comprising:

bus connection terminals for inputting a selection signal and reset signal which are transmitted from the CPU unit through a first signal line for directly connecting the CPU unit with the plurality of peripheral units;

a pair of cascade connection terminals having an input terminal for inputting a selection command signal transmitted from the CPU unit through a second signal line for connecting in cascade the CPU unit and the plurality of peripheral units, and an output terminal for outputting a certain signal based on the selection command signal to the peripheral unit of a subsequent stage as a selection command signal;

signal transmitting means for transmitting the selection command signal to the peripheral unit of the subsequent stage via the second signal line on receiving the selection signal transmitted from the CPU unit while the selection command signal is inputted from the CPU unit side via the second signal line;

access permitting means for permitting access from the CPU unit by the selection signal before transmitting the selection command signal to the peripheral unit of the subsequent stage and for inhibiting access from the CPU unit when the selection signal is inputted after transmitting the selection command signal;

gate means for inhibiting the selection signal from being received when the selection signal is inputted after transmitting the selection command signal to the peripheral unit of the subsequent stage; and reset means for resetting each of the signal transmitting means, the access permitting means and the gate means to an initial state by the reset signal.

14. A peripheral unit as claimed in claim 13, wherein the signal transmitting means comprises a first latch circuit for latching the selection command signal transmitted from the CPU unit when the selection signal is inputted;

the access permitting means comprises:

a second latch circuit which latches its own inverted output upon receiving the selection signal while the selection command signal is inputted, and a first gate circuit which is inserted in an input path of the selection command signal to the second latch circuit and which is opened and closed by an output of the second latch circuit; and the gate means comprises:

a logic circuit which outputs a logic value corresponding to a combination of the outputs of the first and second latch circuits, and a second gate circuit which is inserted in an input path of the selection signal to the first and second latch circuits and which inhibits the selection signal from passing through it based on an output of the logic circuit when the selection command signal is outputted by the first latch circuit and no access from the CPU unit is permitted by the second latch circuit.

15. A peripheral unit as claimed in claim 13, wherein the signal transmitting means comprises a first latch circuit for latching the selection command signal transmitted from the CPU unit when the selection signal is inputted;

the access permitting means comprises:

a second latch circuit which latches an output of the first latch circuit when the selection signal is inputted, and a logic circuit which outputs a logic value corresponding to a combination of the outputs of the first and second latch circuits; and the gate means is inserted in an input path of the selection signal to the second latch circuit and permits the selection signal to pass through it to the second latch circuit when the selection command signal is outputted from the first latch circuit.

16. In a peripheral unit selection system in which a plurality of peripheral units, removably mounted in a plurality of mounting slots provided on a mother board, are connected to a CPU unit via signal lines and the CPU unit accesses each peripheral unit, the mother board comprising:

a cascade connection signal line for connecting in cascade the CPU unit and the peripheral units mounted in the mounting slots; and path selecting means provided for each mounting unit, for selecting between a state in which the cascade connection signal line from the CPU unit side is connected to a subsequent stage side through the peripheral unit mounted in each mounting unit and a state in which the cascade connection signal line is connected to the subsequent stage side without being put through any peripheral unit, wherein the path selecting means is a mechanical switch which is turned on to connect the cascade connection signal line from the CPU unit side to a subsequent stage side without being put through any peripheral unit when no peripheral unit is mounted in the unit mounting slot corresponding to the path selecting means.

17. In a peripheral unit selection system in which a plurality of peripheral units removably mounted in a plurality of mounting slots provided on a mother board are connected to a CPU unit via signal lines and the CPU unit accesses each peripheral unit, the mother board comprising:

a cascade connection signal line for connecting in cascade the CPU unit and the peripheral units mounted in the mounting slots; and path selecting means provided for each mounting unit, for selecting between a state in which the cascade connection signal line from the CPU unit side is connected to a subsequent stage side through the peripheral unit mounted in each mounting unit and a state in which the cascade connection signal line is connected to the subsequent stage side without being put through any peripheral unit, wherein the path selecting means is a selector which connects in an alternative way either one of the cascade connection signal line on the CPU unit side and a predetermined signal line from a peripheral unit mounted in the unit mounting slot corresponding to the path selecting means, to the cascade connection signal line on a subsequent stage side, and the selector connects the predetermined signal line from the peripheral unit to the cascade connection signal line on the subsequent stage side upon receiving a switching signal from the peripheral unit when the peripheral unit is mounted in the unit mounting slot.

18. A mother board as claimed in claim 17, wherein the selector comprises:

a first gate which makes the predetermined signal from the peripheral unit pass through it when the switching signal is inputted;

a second gate which makes the cascade connection signal from the CPU unit side pass through it when an inverted value of the switching signal is inputted; and a logic circuit which transmits the logical sum of output values of both the gates to the cascade connection signal line on the subsequent stage side.

19. A peripheral unit selection system having a plurality of peripheral units and a CPU unit, said peripheral unit selection system comprising:

a mother board comprising:

a plurality of mounting slots in which the plurality of peripheral units are mounted removably, a first signal line for directly connecting the CPU unit with the plurality of peripheral units, and a second signal line for connecting in cascade the CPU unit and the plurality of peripheral units;

first interface means provided in the CPU unit for transmitting a selection signal and a write address to the first signal line and transmitting a write command signal to the second signal line to set an address for each of the peripheral units, and for transmitting a call address to the first signal line to select the peripheral units individually;

second interface means provided in each of the peripheral units, comprising:

address setting means for storing the write address transmitted together with the selection signal through the first signal line from the CPU unit as a unit address, and access permitting means for comparing the call address transmitted from the CPU unit through the first signal line with the unit address set in the address setting means and permitting access from the CPU unit when the addresses coincide with each other;

signal transmitting means provided for each mounting slot on the mother board, for transmitting the write command signal transferred through the second signal line from the CPU unit sequentially to the peripheral unit of a subsequent stage every time the selection signal is received; and gate means provided for each mounting slot on the mother board, for inhibiting the selection signal from being received upon transmitting the write command signal to the peripheral unit of the subsequent stage.

* * * * *